United States Patent
Golitschek Edler von Elbwart

(10) Patent No.: US 9,635,668 B2
(45) Date of Patent: Apr. 25, 2017

(54) DYNAMIC TDD UPLINK/DOWNLINK CONFIGURATION

(71) Applicant: Panasonic Intellectual Property Corporation of America, Torrance, CA (US)

(72) Inventor: Alexander Golitschek Edler von Elbwart, Darmstadt (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/431,271

(22) PCT Filed: Jul. 16, 2013

(86) PCT No.: PCT/EP2013/065003
§ 371 (c)(1),
(2) Date: Mar. 25, 2015

(87) PCT Pub. No.: WO2014/056643
PCT Pub. Date: Apr. 17, 2014

(65) Prior Publication Data
US 2015/0245246 A1 Aug. 27, 2015

(30) Foreign Application Priority Data

Oct. 10, 2012 (EP) .................................. 12188012

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2656* (2013.01); *H04L 1/1861* (2013.01);
(Continued)

(58) Field of Classification Search
CPC ................................................ H04W 72/0446
See application file for complete search history.

(56) References Cited

U.S. PATENT DOCUMENTS 9,276,730 B2  3/2016  Gao et al.
2008/0242371 A1  10/2008  Chiba et al.
(Continued)

FOREIGN PATENT DOCUMENTS

EP  2 498 435 A2  9/2012
JP  2002-109675 A  4/2002
(Continued)

OTHER PUBLICATIONS

3GPP TR 36.828 V11.0.0, "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Rlease 11)," Jun. 2012, 109 pages.

(Continued)

*Primary Examiner* — Jason Mattis
(74) *Attorney, Agent, or Firm* — Seed IP Law Group LLP

(57) ABSTRACT

The invention relates to a method for dynamically indicating a TDD re-configuration to the mobile station by encoding the dynamic TDD re-configuration indication into two control format indicator, CFI, values, where each is transmitted in a different subframe within the same radio frame. The mobile station can determine based on the received two CFI values which TDD configuration is to be applied in the system. The TDD uplink/downlink configuration of the radio frames can thus be dynamically adapted to traffic needs in a fast and reliable way.

16 Claims, 17 Drawing Sheets

| CFI value in subframe i | CFI value in subframe j | TDD Code Points |
|---|---|---|
| 1 | 1 | 1/1 |
| 1 | 2 | 1/2 |
| 1 | 3 | 1/3 |
| 2 | 1 | 2/1 |
| 2 | 2 | 2/2 |
| 2 | 3 | 2/3 |
| 3 | 1 | 3/1 |
| 3 | 2 | 3/2 |
| 3 | 3 | 3/3 |

Total: 9 codepoints

(51) Int. Cl.
  *H04L 5/14*     (2006.01)
  *H04W 72/12*    (2009.01)
  *H04L 1/18*     (2006.01)
  *H04L 27/26*    (2006.01)
  *H04W 28/06*    (2009.01)
  *H04L 5/00*     (2006.01)

(52) U.S. Cl.
  CPC ............ *H04L 5/001* (2013.01); *H04L 5/0094* (2013.01); *H04L 5/14* (2013.01); *H04L 5/1469* (2013.01); *H04L 27/2602* (2013.01); *H04W 28/065* (2013.01); *H04W 72/12* (2013.01); *H04L 5/0007* (2013.01)

(56) References Cited

U.S. PATENT DOCUMENTS

| | | | |
|---|---|---|---|
| 2011/0211503 A1 | 9/2011 | Che et al. | |
| 2012/0300681 A1* | 11/2012 | Ji | H04W 56/00 370/280 |
| 2012/0320806 A1* | 12/2012 | Ji | H04B 7/2656 370/280 |
| 2013/0044652 A1* | 2/2013 | Wang | H04L 1/08 370/280 |
| 2013/0194980 A1* | 8/2013 | Yin | H04L 1/1854 370/280 |
| 2013/0336177 A1* | 12/2013 | Gao | H04W 72/0446 370/280 |
| 2014/0086112 A1* | 3/2014 | Stern-Berkowitz | H04W 72/1289 370/280 |
| 2015/0043392 A1* | 2/2015 | Susitaival | H04L 5/1469 370/280 |
| 2015/0172951 A1* | 6/2015 | Chen | H04W 24/10 370/252 |

FOREIGN PATENT DOCUMENTS

| | | | |
|---|---|---|---|
| WO | 2007/066393 A1 | 6/2007 | |
| WO | 2012/113131 A1 | 8/2012 | |

OTHER PUBLICATIONS

3GPP TS 25.331 V6.7.0, Section 8.1.1, Sep. 2005, 55 pages.
3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, 77 pages.
3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May 2008, 48 pages.
3GPP TS 36.211 V11.0.0, "3rd Generation Partnership Project; Technical Specification Group Radio Access Network; Evolved Universal Terrestrial Radio Access (E-UTRA); Physical Channels and Modulation (Release 11)," Sep. 2012, 106 pages.
3GPP TS 36.212 V11.0.0, "3rd Generation Partnership Project; Technical Specification Group Radio Access Network; Evolved Universal Terrestrial Radio Access (E-UTRA); Multiplexing and channel coding (Release 11)," Sep. 2012, 79 pages.
3GPP TS 36.213 V11.0.0, "3rd Generation Partnership Project; Technical Specification Group Radio Access Network; Evolved Universal Terrestrial Radio Access (E-UTRA); Physical layer procedures (Release 11)," Sep. 2012, 143 pages.
European Search Report dated Feb. 22, 2013, for corresponding EP Application No. 12 188 012.4, 5 pages.
International Search Report dated Aug. 2, 2013, for corresponding International Application No. PCT/EP2013/065003, 3 pages.
Renesas Mobile Europe Ltd., "Discussion on Enhancements for Dynamic TDD UL-DL Configuration," R1-122363, 3GPP TSG-RAN WG1 Meeting #69, Agenda Item: 7.10.4, Prague, Czech Republic, May 21-25, 2012, 4 pages.
Sesia et al., "LTE—The UMTS Long Term Evolution: From Theory to Practice," John Wiley & Sons, Ltd., ISBN: 978-0-470-69716-0, 2009, 626 pages.
Japanese Office Action, mailed Feb. 21, 2017, for Japanese Application No. 2015-536028, 9 pges (with English Translation).

* cited by examiner

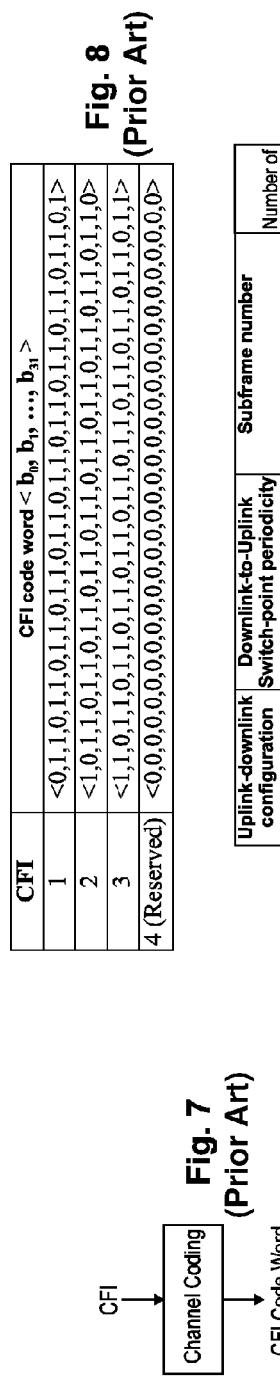
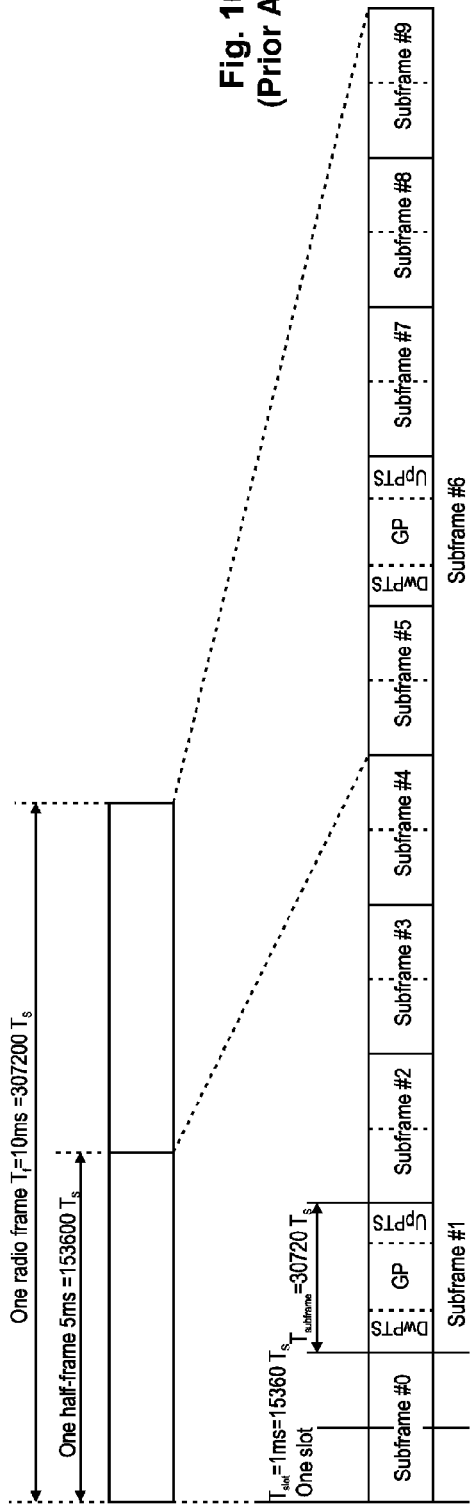
Fig. 7 (Prior Art)
Fig. 8 (Prior Art)
Fig. 9 (Prior Art)
Fig. 10 (Prior Art)

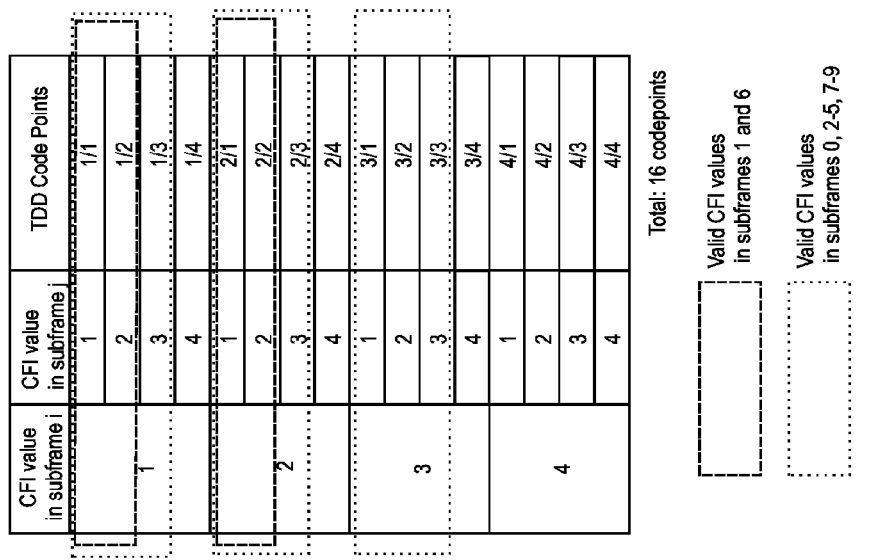
Fig. 13
Fig. 12
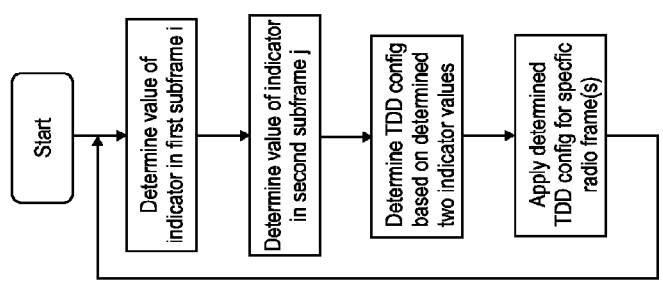
Fig. 11

| CFI value in subframe i | CFI value in subframe j | TDD Code Points |
|---|---|---|
| 1 | 4 | 1/4 |
| 2 | 4 | 2/4 |
| 3 | 4 | 3/4 |
| 4 | 1 | 4/1 |
| 4 | 2 | 4/2 |
| 4 | 3 | 4/3 |
| 4 | 4 | 4/4 | i, j ∈ {0, 2, 3, 4, 5, 7, 8, 9}    Available: 7 codepoints

Fig. 14

| CFI value in subframe i | CFI value in subframe j | TDD Code Points |
|---|---|---|
| 1 | 3 | 1/3 |
| 1 | 4 | 1/4 |
| 2 | 3 | 2/3 |
| 2 | 4 | 2/4 |
| 3 | 1 | 3/1 |
| 3 | 2 | 3/2 |
| 3 | 3 | 3/3 |
| 3 | 4 | 3/4 |
| 4 | 1 | 4/1 |
| 4 | 2 | 4/2 |
| 4 | 3 | 4/3 |
| 4 | 4 | 4/4 | i, j ∈ {1, 6}    Available: 12 codepoints

Fig. 15

| CFI value in subframe i | CFI value in subframe j | TDD Code Points |
|---|---|---|
| 1 | 4 | 1/4 |
| 2 | 4 | 2/4 |
| 4 | 1 | 4/1 |
| 4 | 2 | 4/2 |
| 4 | 4 | 4/4 | i, j ∈ {0-9}    Available: 5 codepoints

Fig. 16

| CFI value in subframe i | CFI value in subframe j | TDD Code Points |
|---|---|---|
| 1 | | |
| 1 | | |
| 1 | 3 | 1/3 |
| 2 | | |
| 2 | | |
| 2 | 3 | 2/3 |
| 3 | 1 | 3/1 |
| 3 | 2 | 3/2 |
| 3 | 3 | 3/3 | i, j ε {1, 6}   Available: 5 codepoints

Fig. 17

| CFI value in subframe i | CFI value in subframe j | TDD Code Points | TDD UL/DL configuration index | Subframe number 0 | 1 | 2 | 3 | 4 | 5 | 6 | 7 | 8 | 9 |
|---|---|---|---|---|---|---|---|---|---|---|---|---|---|
| 1 | | | | | | | | | | | | | |
| 1 | | | | | | | | | | | | | |
| 1 | 3 | 1/3 | 1 | D | S | U | U | D | D | S | U | U | D |
| 2 | | | | | | | | | | | | | |
| 2 | | | | | | | | | | | | | |
| 2 | 3 | 2/3 | 2 | D | S | U | D | D | D | S | U | D | D |
| 3 | 1 | 3/1 | 3 | D | S | U | U | U | D | D | D | D | D |
| 3 | 2 | 3/2 | 4 | D | S | U | U | D | D | D | D | D | D |
| 3 | 3 | 3/3 | 5 | D | S | U | D | D | D | D | D | D | D | i, j ε {1, 6}   Available: 5 codepoints

Fig. 18

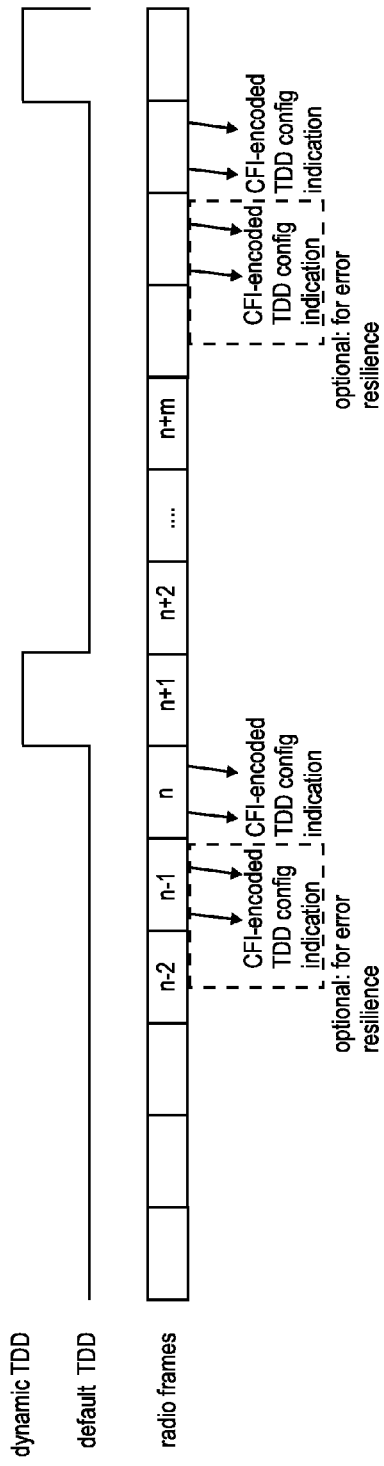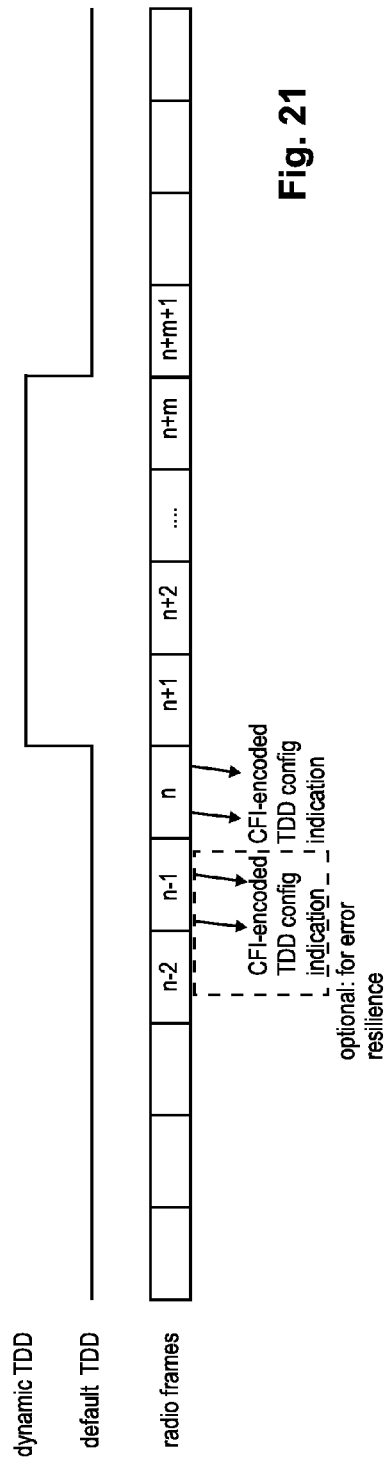

Fig. 22

| CFI value in subframe i | CFI value in subframe j | TDD Code Points |
|---|---|---|
| 1 | 1 | 1/1 |
| 1 | 2 | 1/2 |
| 2 | 1 | 2/1 |
| 2 | 2 | 2/2 |

$i, j \in \{1, 6\}$

Available: 4 codepoints

Fig. 23

| CFI value in subframe i | CFI value in subframe j | TDD Code Points |
|---|---|---|
| 1 | 1 | 2/3 |
| 1 | 2 | 3/1 |
| 1 | 3 | 1/3 |
| 2 | 1 | 2/3 |
| 2 | 2 | 3/1 |
| 2 | 3 | 2/3 |
| 3 | 1 | 3/1 |
| 3 | 2 | 3/2 |
| 3 | 3 | 3/3 |

$i, j \in \{0, 2, 3, 4, 5, 7, 8, 9\}$

Available: 9 codepoints

Fig. 24

| TDD UL/DL configuration index | Subframe number | | | | | | | | | | |
|---|---|---|---|---|---|---|---|---|---|---|---|
| | 0 | 1 | 2 | 3 | 4 | 5 | 6 | 7 | 8 | 9 | |
| 0 | D | S | U | U | U | D | S | U | U | U | default TDD config (SIB1) |
| 2 | D | S | U | D | D | D | S | U | D | D | |

| TDD UL/DL configuration index | Subframe number | | | | | | | | | | |
|---|---|---|---|---|---|---|---|---|---|---|---|
| | 0 | 1 | 2 | 3 | 4 | 5 | 6 | 7 | 8 | 9 | |
| 4 | D | S | U | U | D | D | D | D | D | D | |
| 5 | D | S | U | D | D | D | D | D | D | D | |

| CFI value in subframe i | CFI value in subframe j | TDD Code Points |
|---|---|---|
| 1 | 1 | 1/1 |
| 1 | 2 | 1/2 |
| 2 | 1 | 2/1 |
| 2 | 2 | 2/2 |

Available: 4 codepoints

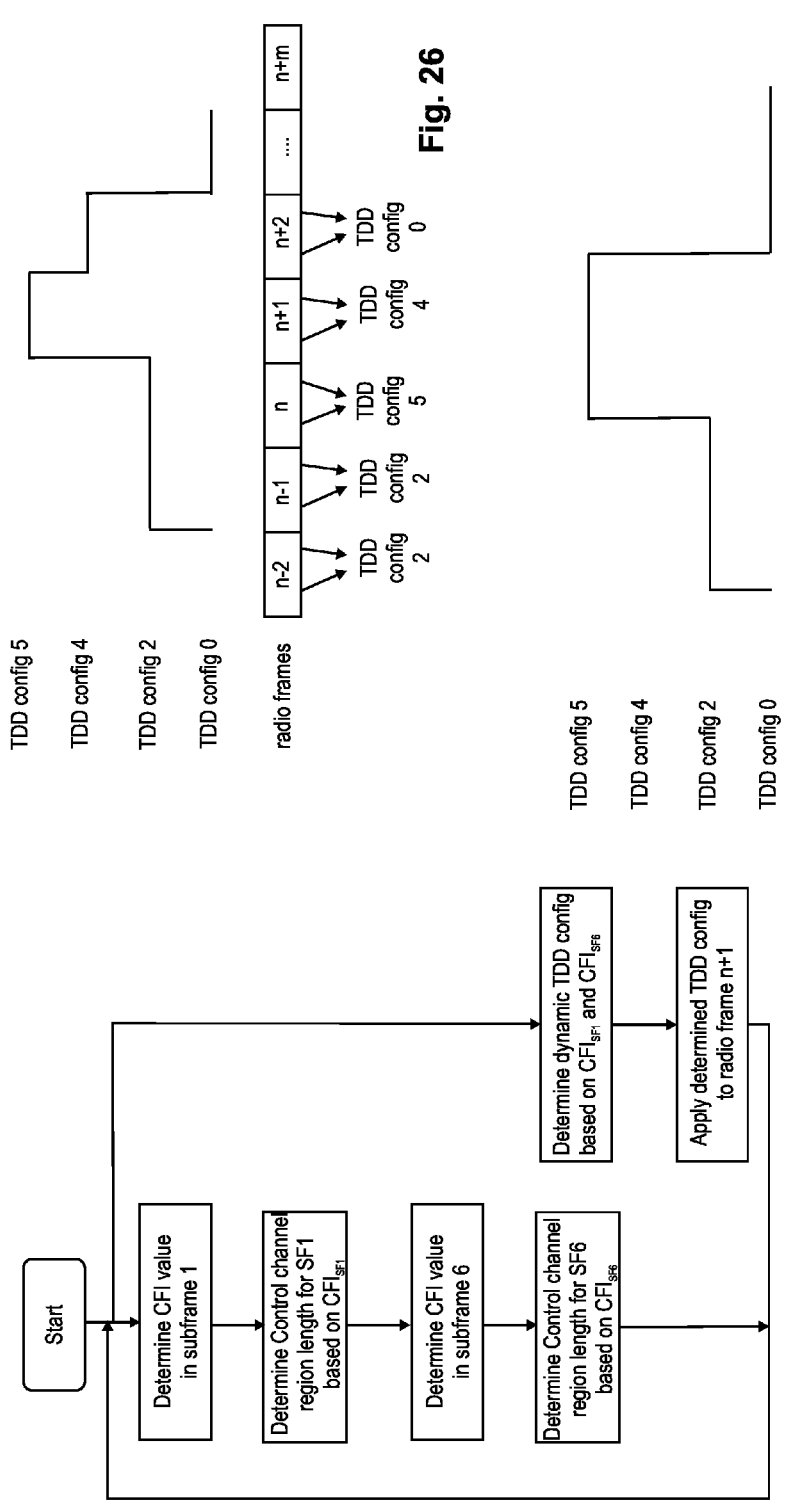

Fig. 28

| CFI value in subframe i | CFI value in subframe j | TDD Code Points |
|---|---|---|
| 1 | 1 | 2/3 |
|   | 2 | 3/1 |
|   | 3 | 1/3 |
| 2 | 1 | 2/3 |
|   | 2 | 3/1 |
|   | 3 | 2/3 |
| 3 | 1 | 3/1 |
|   | 2 | 3/2 |
|   | 3 | 3/3 | i, j ∈ {0, 1, 2, 3, 4, 5, 6, 7, 8, 9}    Available: 9 codepoints

Fig. 29

| CFI value in subframe 1 | CFI value in subframe 6 | TDD Code Points | TDD UL/DL configuration index | Subframe number | | | | | | | | | |
|---|---|---|---|---|---|---|---|---|---|---|---|---|---|
| | | | | 0 | 1 | 2 | 3 | 4 | 5 | 6 | 7 | 8 | 9 |
| 1 | 1 | 1/1 | 0 | D | S | U | U | U | D | S | U | U | U |
|   | 2 | 1/2 | 1 | D | S | U | U | D | D | S | U | U | D |
|   | 3 | 1/3 | 2 | D | S | U | D | D | D | S | U | D | D |
| 2 | 1 | 2/1 | 3 | D | S | U | U | U | D | D | D | D | D |
|   | 2 | 2/2 | 4 | D | S | U | U | D | D | D | D | D | D |
|   | 3 | 2/3 | reserved | | | | | | | | | | |
| 3 | 1 | 3/1 | 5 | D | S | U | D | D | D | D | D | D | D |
|   | 2 | 3/2 | 6 | D | S | U | U | U | D | S | U | U | D |
|   | 3 | 3/3 | reserved | | | | | | | | | | |

Fig. 32

| TDD UL/DL configuration index | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | index independent / index independent

Fig. 33

| CFI value in subframe i | Subframe number | | | | | | | | | |
|---|---|---|---|---|---|---|---|---|---|---|
| | 0 | 1 | 2 | 3 | 4 | 5 | 6 | 7 | 8 | 9 |
| 1 | D | S | U | U | U | D | | | | |
| 2 | D | S | U | U | D | D | | | | |
| 3 | D | S | U | D | D | D | | | | |

Fig. 34

| CFI value in subframe j | Subframe number | | | | | | | | | |
|---|---|---|---|---|---|---|---|---|---|---|
| | 0 | 1 | 2 | 3 | 4 | 5 | 6 | 7 | 8 | 9 |
| 1 | D | S | U | | | D | S | U | D | D |
| 2 | D | S | U | | | D | D | D | U | D |
| 3 | D | S | U | | | D | D | D | U | D |

Fig. 35

| CFI value in subframe i | CFI value in subframe j | Subframe number | |
|---|---|---|---|
| | | 8 | 9 |
| 1 | 1 | U | U |
| 2 | 1 | U | D |

Fig. 36

| TDD UL/DL configuration index | TDD Code Points | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | | D | S | U | U | U | D | S | U | U | U |
| 3 | 1/1 | D | S | U | U | U | D | D | D | D | D |
| 6 | 1/2 | D | S | U | U | U | D | S | U | U | D |
| 1 | 1/3 | D | S | U | U | D | D | S | U | U | D |
| 4 | 2/1 | D | S | U | U | D | D | D | D | D | D |
| | 2/2 | | | | | | | | | | |
| 2 | 2/3 | D | S | U | D | D | D | S | U | D | D |
| 5 | 3/1 | D | S | U | D | D | D | D | D | D | D |
| | 3/2 | | | | | | | | | | |
| | 3/3 | | | | | | | | | | |

Available: 9 codepoints

| CFI value in subframe i | CFI value in subframe j |
|---|---|
| 1 | 1 |
| | 2 |
| | 3 |
| 2 | 1 |
| | 2 |
| | 3 |
| 3 | 1 |
| | 2 |
| | 3 |

DYNAMIC TDD UPLINK/DOWNLINK CONFIGURATION

FIELD OF THE INVENTION

The invention relates to methods for indicating a Time Division Duplex uplink/downlink configuration for a mobile station. The invention is also providing the mobile station and the base station for performing the methods described herein.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called subframes. In 3GPP LTE (Release 8) each subframe is divided into two downlink slots as shown in FIG. 3, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g. 7 OFDM symbols) and $N_{sc}^{RB}$ consecutive subcarriers in the frequency domain as exemplified in FIG. 4 (e.g. 12 subcarriers for a component carrier). In 3GPP LTE (Release 8), a physical resource block thus consists of $N_{symb}^{DL} \times N_{sc}^{RB}$, resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Logical and Transport Channels

The MAC layer provides a data transfer service for the RLC layer through logical channels. Logical channels are either Control Logical Channels which carry control data such as RRC signalling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

With respect to scheduling grants, the information sent on the L1/L2 control signaling may be separated into the following two categories, Shared Control Information (SCI) carrying Cat 1 information and Downlink Control Information (DCI) carrying Cat 2/3 information. For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference. The different DCI formats that are currently defined for LTE are as follows and described in detail in 3GPP TS 36.212, "Multiplexing and channel coding", section 5.3.3.1 (available at http://www.3gpp.org and incorporated herein by reference).

Physical Downlink Control Channel (PDCCH) and Physical Downlink Shared Channel (PDSCH)

The physical downlink control channel (PDCCH) carries e.g. scheduling grants for allocating resources for downlink or uplink data transmission.

Each PDCCH is transmitted using one or more so called Control Channel Elements (CCEs). Each CCE corresponds to a set of Resource Elements (REs). In 3GPP LTE, at the moment one CCE consists of 9 Resource Element Groups (REGs), where one REG consists of four consecutive REs (consecutive in the frequency domain) excluding potential REs of reference signals. The resource elements occupied by reference symbols are not included within the REGs, which means that the total number of REGs in a given OFDM symbol depends on whether or not reference signals are present.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

In 3GPP LTE a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a subframe.

On a transport channel level, the information transmitted via the PDCCH is also referred to as L1/L2 control signaling. L1/L2 control signaling is transmitted in the downlink for each user equipment (UE). The control signaling is commonly multiplexed with the downlink (user) data in a subframe (assuming that the user allocation can change from subframe to subframe).

The physical downlink shared channel (PDSCH) is mapped to the remaining OFDM symbols within one subframe that are not occupied by the PDCCH. The PDSCH resources are allocated to the user equipments in units of resource blocks for each subframe.

FIG. 5 shows the exemplary mapping of PDCCH and PDSCH within a normal subframe (having $2 \cdot N_{symb}^{DL}=14$ OFDM symbols in the time domain), respectively a resource block pair (see magnification). In this exemplary case, the first $N_{symb}^{PDCCH}=2$ OFDM symbols (control channel region) are used for L1/L2 control signaling, i.e. for signaling the PDCCH, PHICH, PCFICH, and the remaining $N_{symb}^{PDSCH}=12$ OFDM symbols (PDSCH region) are used for data.

(Broadcast) System Information Structure

In the 3GPP terminology, (broadcast) system information is also denoted BCCH information, i.e. it denotes the information carried on the Broadcast Control CHannel (being a logical channel) of the radio cell to which the UE is connected (active state) or attached (idle state).

Generally, system information includes a master information block (MIB) and several system information blocks (SIBs). MIB contains control information on each System Information Block. The control information associated to a respective SIB may have the following structure. Respective control information associated to a SIB may indicate the position of the SIB on a transport channel (e.g. position in the time-frequency plane for OFDM radio access, i.e. particular Resource Blocks being assigned for transmission of a respective SIB) on which it is transmitted relative to common timing reference. Further, a repetition period of SIB may be indicated. This repetition period indicates the periodicity at which the respective SIB is transmitted. The control information may also include a timer value for timer-based update mechanism or, alternatively, a value tag for a tag-based update of the SIB information.

The table below shows an overview of the categorization and types of system information blocks in a UMTS legacy system as defined in 3GPP TS 25.331, "Radio Resource Control (RRC)", version 6.7.0, section 8.1.1, incorporated herein by reference; available at http://www.3gpp.org). The classification of the system broadcast information into the different SIBs is based on the content and temporal variability that is indicated on the third column of the table.

| SIB | Content | Temporal Variability |
|---|---|---|
| SIB1 | NAS info, UE timers/counters | low |
| SIB2 | URA identity | low |

-continued

| SIB | Content | Temporal Variability |
|---|---|---|
| SIB3 | Cell selection parameters | low |
| SIB4 | Cell selection par. for connected mode | low |
| SIB5 | Common physical channels configuration | medium |
| SIB6 | Common physical channels configuration | medium |
| SIB7 | Interference/dynamic persistence level | high |
| SIB11 | Measurement control | medium |
| SIB12 | Measurement control information for connected mode | medium |
| SIB13 | ANSI-41 info | low |
| SIB14 | Outer loop power control information | medium |
| SIB15 | Positioning information | low |
| SIB16 | Preconfiguration | medium |
| SIB17 | Configuration of shared physical channels in connected mode | high |
| SIB18 | PLMN IDs of neighbouring cells | low |

Physical Control Format Indicator Channel—PCFICH

Three downlink physical control channels are provided in LTE: The Physical Control Format Indicator Channel (PCFICH), the Physical HARQ Indicator Channel (PHICH) and the PDCCH. In general, the downlink control channels can be configured to occupy the first 1, 2 or 3 OFDM symbols in a subframe. There are two special cases: in subframes containing MBSFN (Multimedia Broadcast Single Frequency Network) transmissions there may be 0, 1 or 2 OFDM symbols for control signaling, while for narrow system bandwidths (less than 10 RBs) the number of control symbols is increased and may be 2, 3 or 4 to ensure sufficient control channel capacity and coverage at the cell border. This flexibility allows the control channel overhead to be adjusted according to the particular system configuration, traffic scenario and channel conditions.

In correspondence with above, the following Table from 3GPP TS 36.211 v11.0.0 Table 7.7-1 gives an overview of the Number of OFDM symbols used for PDCCH.

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

For system bandwidths $N_{RB}^{DL}>10$, the span of PDCCH in unit of OFDM symbols, (1, 2 or 3) is given directly by the CFI; for system bandwidths $N_{RB}^{DL} \leq 10$, the span of PDCCH in units of OFDM symbols (2, 3 or 4) is given by adding 1 to the CFI, CFI+1. Chapter 5.3.4 of 3GPP TS 36.212 v11.0.0 defines the CFI and is incorporated herein by reference.

In subframes 1 and 6, the PHICH length is configured to be either normal=1 or extended=2 OFDM symbols. TS 36.211 v11.0.0 in Table 6.9.3-1 gives a more detailed definition of the PHICH duration; the PHICH duration is configurable by higher layers according to the following Table.

| PHICH duration | Non-MBSFN subframes | | MBSFN subframes on a carrier supporting PDSCH |
|---|---|---|---|
| | Subframes 1 and 6 in case of frame structure type 2 | All other cases | |
| Normal | 1 | 1 | 1 |
| Extended | 2 | 3 | 2 |

Correspondingly, PHICH puts a lower limit on the size of the control channel region at the start of each subframe (as signalled by the PCFICH). PHICH carries the HARQ ACK/NACK, indicating whether the eNodeB has correctly received to transmission on the PUSCH. This information is repeated in each of the three BPSK symbols. More information on the PHICH can be taken of Chapter 9.3.4 of LTE—The UMTS Long Term Evolution—From Theory To Practice Edited by: Stefania Sesia, Issam Toufik and Matthew Baker, Second Edition, incorporated herein by reference.

The PCFICH carries a Control Format Indicator (CFI) which indicates the number of OFDM symbols used for transmission of control channel information in each downlink subframe to the UE. In principle, the UE could deduce the value of the CFI without a channel such as the PCFICH; i.e. by multiple attempts to decode the control channels assuming each possible number of symbols. However, this would result in significant additional processing load. In LTE three different CFI values are used, as outlined earlier.

In order to make the CFI sufficiently robust, each CFI value is encoded into a codeword of 32 bits in length (see FIG. 7), mapped to 16 REs using QPSK modulation. These 16 REs are arranged in groups of 4, known as Resource Element Groups (REGs). The REs occupied by RSs (Reference Signals) are not included within the REGs, which means that the total number of REGs in a given OFDM symbols depends on whether or not cell-specific RSs are present. The concept of REGs is also used for the other downlink control channels, PHICH and PDCCH.

The PCFICH is transmitted on the same set of antenna ports as the PBCH (Physical Broadcast Channel), with transmit diversity being applied if more than one antenna port is used.

Correspondingly, the CFI value-to-codeword mapping is defined for four values 1-4, as depicted in the following Table and FIG. 8, with the corresponding 32-bit code word. Value and codeword 4 is reserved, since the first three values are sufficient to signal the desired information of up to three different lengths.

TABLE 1

| CFI | CFI codeword <$b_0, b_1, \ldots, b_{31}$> |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

In order to achieve frequency diversity, the REGs carrying the PCFICH are distributed across the frequency domain. This is done according to a predefined pattern in the first OFDM symbol in each downlink subframe, as depicted in FIG. 6, so that the UE can always locate the PCFICH information, which is a prerequisite to being able to decode the rest of the control signaling. The CFI is not available in uplink subframes.

To minimize the possibility of confusion with PCFICH information from a neighbouring cell, a cell-specific frequency offset is applied to the positions of the PCFICH REs; this offset depends on the Physical Cell ID (PCI), which is deduced from the Primary and Secondary Synchronization Signals (PSS and SSS). In addition, a cell-specific scrambling sequence (again a function of the PCI) is applied to the CFI codewords, so that the UE can preferentially receive the PCFICH from the desired cell.

Most of the above information is taken from Chapters 9.3.2 and 9.3.3 of LTE—The UMTS Long Term Evolution—From Theory To Practice Edited by: Stefania Sesia, Issam Toufik and Matthew Baker, Second Edition. Chapter 6.7 of 3GPP TS 36.211 v11.0.0 defines the PCFICH, its scrambling, modulating etc. according to Release 11, and is incorporated herein by reference.

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes which contain a guard period to allow for switching between the downlink and uplink transmission. The guard period allows the uplink transmission timing to be advanced. This TDD structure is known as "Frame Structure Type 2" in 3GPP LTE Release 8 and later, of which seven different configurations are defined, which allow a variety of downlink-uplink ratios and switching periodicities. FIG. 9 illustrates the Table with the 7 different TDD uplink downlink configurations, indexed from 0-6. As can be seen therefrom, the seven available TDD uplink-downlink configurations can provide between 40% and 90% of downlink subframes.

FIG. 10 shows the frame structure type 2, particularly for a 5 ms switch-point periodicity, i.e. for TDD configurations 0, 1, 2 and 6.

FIG. 10 illustrates a radio frame, being 10 ms in length, and the corresponding two half-frames of 5 ms each. The radio frame consists of 10 subframes with 1 ms, where each of the subframes is assigned the type of uplink, downlink or special, as defined by the table of FIG. 9, where "D" means Downlink, "U" means Uplink and "S" means Special.

As can be appreciated from FIG. 9, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and of UpPTS (Uplink Pilot Time Slot). The following Table shows information on the special subframe and in particular lists the lengths of DwPTS (Downlink Pilot Time Slot), the GP (Guard Period) and of UpPTS (Uplink Pilot Time Slot) as defined for 3GPP LTE Release 11.

|  |  | Normal cyclic prefix in downlink | | Extended cyclic prefix in downlink | | |
|---|---|---|---|---|---|---|
|  |  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on may operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e. which subframe to monitor for measurement, for CSI measure and report, for time domain filtering to get channel estimation, for PDCCH detection, or for UUDL ACK/NACK feedback.
Shortcoming of Current Semi-Static TDD UL/DL Configuration Scheme Currently, LTE TDD allows for asymmetric UL-DL allocations by providing seven different semi-statically configured uplink-downlink configurations. The current mechanism for adapting UL-DL allocation is based on the system information acquisition procedure or the system information change procedure, where the TDD UL-DL configuration is indicated by a SIB, particularly the TDD-config parameter in SIB1.

With the Release 8 system information change procedure, the supported time scale for a TDD UL/DL re-configuration is every 640 ms or larger. When re-using the ETWS (Earthquake and Tsunami Warning System), the supported time scale for TDD UL-DL re-configuration is every 320 ms or larger depending on the configured default paging cycle.

The semi-static allocation of the TDD UUDL configuration may or may not match the instantaneous traffic situation. However, it would be advantageous to adapt the TDD UL/DL configuration to the current traffic needs; for instance, in order to dynamically create more blank uplink subframes to mitigate interference to the communication e.g. in uplink or downlink of a neighbouring cell. Correspondingly, it is expected that Release 12 will adopt a more dynamic change of the TDD UUDL configuration.

3GPP launched a study item TR 36.828 v11.0.0 to study the time scales of various types of TDD UL/DL re-configurations and their benefits and disadvantages. In general, the study item concluded that faster TDD UUDL re-configuration time scales provide larger benefits than slower TDD UUDL re-configuration time scales. Further, the amount of required specification changes varies depending on the supported re-configuration time scales.

The study item however also identified problems for legacy UEs (UEs conformant to only earlier than Release 12 standards that do not implement the dynamic TDD re-configuration mechanism) stemming from different TDD configurations for different UEs. In particular, it is assumed that when the base station wants to dynamically reconfigure the TDD configuration for UEs in a cell, the dynamic TDD re-configuration could only be processed properly by the new UEs; in case the existing SIB-based TDD configuration indication method is not used but a more dynamic indication method, the legacy UEs would not apply the TDD re-configuration. Therefore, the legacy UEs will still assume the presence of reference signals e.g. CRS (Common Reference Symbol) in downlink subframes of the radio frame according to the default (i.e. the SIB-indicated) TDD configuration. In case the dynamic TDD configuration has an uplink subframe instead of an downlink subframe, the legacy UE would thus wrongly assume the CRS to be present, which may lead to wrong measurement and channel estimations.

The study item also considered RRC, MAC and PHY signaling as more dynamic indication methods. TDD UL/DL re-configuration by RRC signaling is in the order of 200 ms and requires a re-configuration message per RRC-connected user, unless a broadcast or a multicast approach is specified. TDD UL/DL re-configuration by MAC Control Element (CE) signaling in the MAC header is the order of a few tens of ms. Using the Physical layer design a time scale of TDD UUDL adaptation in the order of 10 ms can be achieved.

In view of the results of the above study item, a TDD UUDL re-configuration should be performed as fast as possible, thus allowing for a flexible adaptation of the TDD UL/DL configuration to the traffic situations.

SUMMARY OF THE INVENTION

One object of the invention is to provide an improved Time Division Duplex configuration indication, that solves the problems of the prior art as discussed above. A dynamic adaptation of the TDD configuration of a radio frame should be preferably possible.

The object is solved by the subject matter of the independent claims. Advantageous embodiments are subject to the dependent claims.

According to a first aspect, the Time Division Duplex (TDD) configuration to be used for communication between the mobile station and the base station is encoded by the base station into a particular indicator of two subframes within a single radio frame. In other words, two values of an indicator, in two subframes, jointly encode the TDD configuration to be used. The mobile station accordingly receives the two indicators in the respective two subframes of the radio frame, determines their values and the associated Time Division Duplex configuration and applies the determined Time Division Duplex configuration accordingly.

In more specific embodiments, the indicator is the Control Format Indicator (CFI) which is normally used in a communication system to indicate the control channel region length of the subframe; the CFI is transmitted within every downlink and special subframe (i.e. not in the uplink subframes) of a radio frame. Put simply, the CFI transmitted within such a subframe can take the values of 1, 2 or 3, correspondingly indicating that the control channel region (i.e. occupied for transmitting the PHICH, PCFICH, PDCCH) is 1, 2 or 3 OFDM symbols long or 2, 3 or 4 OFDM symbols long; which case applies is a function of the downlink bandwidth; the remaining downlink OFDM symbols are then available for scheduling downlink user data on the PDSCH. More information on how the CFI is usually employed in a communication system according to the current Release 11 can be derived from the Background Chapter above.

In general, the CFI can take the values 1, 2, 3 or 4, albeit the value 4 is usually not used, but reserved only (see FIG. 8).

In summary, one aspect suggests reusing the CFI for the purpose of indicating the TDD configuration dynamically to the mobile station (s).

Though any combination of two subframes of a radio frame would be theoretically possible for the above aspect, it would be particularly advantageous to use two subframes of which at least one offers the least or a smaller number of OFDM symbols for downlink transmissions than any other of the 10 subframes 0-9 of the radio frame. The advantage is that the usage of an existing indicator field for new purposes generally bears the risk that legacy UEs (or equivalently, legacy mobile terminals) are not aware of this new usage. Consequently, legacy UEs could interpret the existing indicator differently than a newer UE. In the context of the CFI, this may cause the legacy UE to assume a different control channel region length (in terms of OFDM symbols) than newer UEs would. Consequently, a wrong assumption on the control channel region length in a subframe would generally lead to an inability to correctly detect any physical control channel in that subframe. This in turn means that a legacy UE might not be able to read PDSCH assignments conveyed by means of downlink control information on a PDCCH in that subframe, and consequently that such a subframe is lost for the communication with a legacy UE—on the other hand, newer UEs can still use the subframe as desired. It is therefore beneficial if the potential loss particularly of downlink transmission capacity for legacy UEs is minimised. This is evidently the case in a subframe where fewer OFDM symbols are available for downlink than in other subframes, such as in a special subframe. In the seven existing TDD configurations, subframe 1 is always such a special subframe, whereas subframe 6 is a normal downlink subframe or a special subframe, depending on the TDD configuration. However, even if subframe 6 is a normal downlink subframe, the control region length in both subframes 1 and 6 is upper-bounded as 2 OFDM symbols. Therefore, the PDCCH capacity is generally smaller than in other subframes (where a length of up to 3 or 4 OFDM symbols is allowed).

A generally reduced PDCCH capacity is another preferable criterion to find a suitable subframe for the TDD indicator transmission, because a smaller PDCCH capacity means that fewer UEs can be assigned for downlink transmission, so that in those subframes the relative loss of not being able to communicate with legacy UEs is generally (or in other words, on average when e.g. assuming that the control channel region length is statistically uniformly distributed between the allowed values) smaller than it would be in other subframes.

As a result, subframes 1 and 6 are used according to one embodiment. Or at least one of subframes 1 and 6.

Several variations of the above aspect are possible with respectively different impacts on legacy UEs and on the flexibility of the dynamic TDD re-configuration.

For convenience, unless otherwise explicitly stated the following discussion assumes that a "mobile station" is not a legacy UE, but is rather aware of the different usage of an existing indicator field.

A first variation exploits the fact that for subframes 1 and 6, only CFI values 1 and 2 can be used normally; i.e. value 3 is normally not allowed according to the current standardization. Correspondingly, in this variation the TDD re-configuration is encoded by the base station using at least one invalid CFI. Put differently, the base station sets at least one of the two CFIs in subframes 1 and 6 to the value 3, when indicating a particular TDD configuration. In total, up to 5 different code points are thus possible (1/3, 2/3, 3/1, 3/2 and 3/3), which can be used to indicate different TDD configurations.

Consequently, a mobile station receiving an invalid CFI value in one subframe or the two subframes knows that a TDD re-configuration is being indicated and correspondingly proceeds to determine the particular TDD configuration based on the two CFI values. In the subframe indicating an invalid CFI, the invalid one does not indicate the control region length as usual; the mobile station has to consider another parameter in said respect, such as a pre-configured control region length or the minimum length given by the PHICH length configuration that is part of the master information block. In the other subframe, if an invalid CFI is indicated (as for codepoint 3/3), the same applies. On the other hand, in case the second of the two subframes indicates a valid CFI, this valid CFI can be used as usual, i.e. as indicating the control region length of the subframe.

Considering that the CFI value 4 is invalid for all subframes, the above principle regarding invalid value 3 can be applied not only to subframes 1 and 6, but to any two subframes out of the ten subframes of a radio frame. For instance, the CFI in subframes 2 and 7 (or any other two subframes out of 0, 2, 3, 4, 5, 7, 8 or 9) could be re-used to encode the TDD configuration, with seven available code points 1/4, 2/4, 3/4, 4/4, 4/1, 4/2, 4/3.

On the other hand, when still using the CFI in subframes 1 and 6 for encoding the TDD re-configuration, when considering the invalid CFI value 4 as well, more code points can be defined; namely, 12 in total (1/3, 1/4, 2/3, 2/4, 3/1, 3/2, 3/3, 3/4, 4/1, 4/2, 4/3, 4/4). Thus, the disadvantage that when only using the invalid CFI value 3, not all seven TDD configurations can be encoded and differentiated by the five available code points, is not true. When using the invalid CFI values 3 and 4 at the same time, the 12 available code points are more than enough to encode the seven possible TDD configurations, so that in such cases multiple code points may represent the same TDD configuration.

A second variation of the above aspect is contrary to the first variant in that it encodes the TDD configuration using only valid CFIs, i.e. only using the values 1 and 2 for the CFI that are allowed to be used according to the standard for subframes 1 and 6. Thus, four different code points are available, 1/1, 1/2, 2/1 and 2/2. Conversely, when subframes different from subframes 1 and 6 are employed to convey the dynamic TDD re-configuration via the CFI values, the values 1, 2 and 3 can be used, providing 9 possible code points (similar to the third variant explained later).

One advantage is that the CFI in these two subframes (preferably subframes 1 and 6) can be used at the same time for dynamic TDD re-configuration and for indicating the control channel region length for these subframes. The control channel in those subframes has to basically adapt to the CFI values re-used for the encoded dynamic TDD configuration. In that case even legacy UEs are able to detect the control channel region length correctly from the CFI, and can be further able to read on PDCCH a resource assignment for downlink or uplink transmissions.

In order to further improve the TDD re-configuration according to this second variant, one of the four code points available indicates the default TDD configuration with which the mobile station is already configured (using SIB1), as will be explained. In the second variation the mobile station cannot differentiate between a TDD re-configuration and the usual purpose of CFI, when determining the CFI value(s) in the two subframes 1 and 6. Correspondingly, the mobile station has to apply the TDD configuration as indicated by the two CFI values for each radio frame. Further, legacy UEs that are not capable of the dynamic TDD re-configuration as suggested in this application, follow the default TDD configuration that was configured by using the SIB1 exchange. In order to allow legacy UEs as well as UEs, supporting the dynamic TDD re-configuration, to follow the same TDD configuration, it is thus advantageous if one out the four code points available with this second variant indicates the TDD configuration as currently used and configured in the communication system.

A third variant of the first aspect does not differentiate between valid and not-valid CFI values and thus, all possible values of the CFI can be used to encode the TDD configuration. Using three out of the four possible CFI values (e.g. 1, 2 and 3, or 1, 2 and 4), yields 9 possible code points. Since only seven TDD configurations currently exist in the standard, using three CFI values is sufficient. And it is assumed in the following that the CFI values 1, 2 and 3 are used for TDD re-configuration.

Again, without additional information given e.g. by another configuration message, the mobile station is not able to distinguish between a CFI having the standardized purpose (i.e. indicating control channel region length) and the CFI re-used for dynamically changing the TDD configuration. Correspondingly, the mobile station has to consider every CFI combination of the two subframes as indicating a TDD configuration to be used. Therefore, UE behavior has to be specified as how the control region length of the particular subframes is to be determined by the mobile station. There are several possibilities, also depending on which subframes include the CFI(s) used for encoding the TDD configuration. For instance, when only valid CFI values are used, these valid CFI values in the two subframes can also be used by the UE to determine the control channel length; this applies, for instance, to subframes 1 and 6 in combination with valid CFI values 1 and 2, or to subframes other than 1 and 6 in combination with valid CFI values 1, 2 and 3. In those cases, the control channels transmitted at the beginning of the particular frames have to adapt to the CFI values used for encoding the TDD configuration.

On the other hand, if an invalid CFI value is used in a subframe, the mobile station can assume that this invalid CFI partly encodes the TDD configuration (i.e. not a control channel region length as usual), and thus determines the control channel region length in said particular subframe differently. For example, a pre-configured parameter can be used indicating one of the valid CFI values for said subframe, i.e. 1 or 2 for subframes 1 and 6, or 1, 2 or 3 for the other subframes. Alternatively, the minimum control region length given by the corresponding PHICH length parameter could be considered by the mobile station and base station for the control channel region length used in those subframes.

The present invention provides a method for indicating a Time Division Duplex, TDD, configuration to a mobile station in a communication system. The TDD configuration defines uplink, downlink and special subframes for radio frames. The base station sets a first value of an indicator in a first subframe i of a radio frame n and sets a second value of the indicator in a second subframe j of the same radio frame n to encode a TDD configuration. The mobile station determines the first value of the indicator in the first subframe i and determines the second value of the indicator in the second subframe j. The mobile station then determines the TDD configuration based on the determined first and second value of the indicator. According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take a value of either 1, 2 or 3, wherein i=1 and j=6 out of subframes 0-9 of a radio frame. The TDD configuration is encoded by setting at least one of the value of the CFI in the first and second subframes i, j to the value 3. In case at least one of the two CFIs in the respective subframes i and j of radio frame n has the value 3, the mobile station determines the TDD configuration based on the determined first and second value of the two CFIs. In case neither of the two CFIs in the respective subframes 1 and 6 of radio frame n has the value 3, the mobile station does not determine the TDD configuration but determines the control region length in the subframes 1 and 6 respectively based on the determined first and second value of the two CFIs.

According to an advantageous embodiment of the invention which can be used in addition or alternatively to the above, the TDD configuration, determined based on the first CFI value being 3 and the second CFI value being 3, is a TDD configuration that is used the least probable as a TDD configuration in the communication system.

According to an advantageous embodiment of the invention which can be used in addition or alternatively to the above, the mobile station is configured with a default TDD configuration, the default TDD configuration defining significantly more uplink subframes in a radio frame than downlink subframes, such as a TDD configuration associated with TDD configuration index 0 or 6. The TDD configurations determined by the CFI values in subframes 1 and 6, define at least as many downlink subframes in a radio frame as uplink subframes, but preferably more downlink subframes in a radio frame than uplink subframes, such as TDD configurations associated with a TDD configuration index 1, 2, 3, 4 and 5.

According to an advantageous embodiment of the invention which can be used in addition or alternatively to the above, the default TDD configuration is a TDD configuration conveyed to the mobile station using a system information acquisition procedure or a system information change procedure.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols, and the CFI can take a value of either 1, 2, 3 or 4, wherein i, j$\in$\{0, 1, 2, 3, 4, 5, 6, 7, 8, 9\} out of subframes 0-9 of a radio frame. The TDD configuration is encoded by setting at least one of the value of the CFI in the first and second subframes i, j to the value 3 or 4. In case at least one of the two CFIs in the respective subframes i and j of radio frame n has the value 3 or 4, the mobile station determines the TDD configuration based on the determined first and second value of the two CFIs. In case neither of the two CFIs in the respective subframes 1 and 6 of radio frame n has the value 3 or 4, the mobile station does not determine the TDD configuration but determines the control region length in the subframes i and j respectively based on the determined first and second value of the two CFIs.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols, and the CFI can take either the value of 1, 2 or 3, wherein i=1 and j=6 out of subframes 0-9 of a radio frame. The TDD configuration is encoded by setting the value of the CFI in the first and second subframes i, j to one of the values 1 or 2. The mobile station determines the TDD configuration based on the determined first and second value of the CFI. Further, mobile station determines the control region length in the subframes i and j respectively based on the first and second value of the CFIs.

According to an advantageous embodiment of the invention which can be used in addition or alternatively to the above, one TDD configuration out of the TDD configurations determined based on the two CFI values respectively having the value 1 or 2, is a default TDD configuration with which the mobile station is configured.

According to an advantageous embodiment of the invention which can be used in addition or alternatively to the above, the default TDD configuration defines significantly more uplink subframes in a radio frame than downlink subframes, such as a TDD configuration associated with a TDD configuration index 0 or 6. The TDD configurations determined by the CFI values in subframes 1 and 6, define at least as many downlink subframes in a radio frame as uplink subframes, but preferably more downlink subframes in a radio frame than uplink subframes, such as TDD configurations associated with a TDD configuration index 1, 2, 3, 4 and 5.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols, and the CFI can take either the value of 1, 2 or 3, wherein i=1 and j=6 out of subframes 0-9 of a radio frame. The TDD configuration is encoded by setting the value of the CFI in the first and second subframes i, j, to one of the values 1, 2 or 3. The mobile station determines the control region length in the first and second subframes i, j of radio frame n based on: 1) a predetermined control region length, set for the first and second subframe i, j respectively of radio frame n, 2) the value of the CFI in the first and second subframes i, j respectively, when the CFI value is 1 or 2, or 3) a length value of a Physical HARQ, Hybrid Automatic Repeat Request, Indicator Channel, PHICH in the respective subframe i, j.

According to an advantageous embodiment of the invention which can be used in addition or alternatively to the above, the TDD configuration, determined based on the first CFI value being 3 and the second CFI value being 3, is associated with a TDD configuration that is used the least probable as a TDD configuration in the communication system.

According to an advantageous embodiment of the invention which can be used in addition or alternatively to the above, the association between the TDD configurations and the first and second values of the indicator in the respective first and second subframes i, j is such that:
- at least subframes 0-4 out of subframes 0-9 of a radio frame are determinable by the mobile station to be either uplink, downlink or special subframes based on only the determined first value of the indicator in the first subframe i, and/or
- at least subframes 5-7 out of subframe 0-9 of a radio frame are determinable by the mobile station to be either uplink, downlink or special subframes based on only the determined second value of the indicator in the second subframe j.

According to an advantageous embodiment of the invention which can be used in addition or alternatively to the above, the mobile station is configured with a default TDD configuration, and wherein
1) the determined TDD configuration is applied by the mobile station for radio frame n+m, wherein m is an integer and m>=1, or
2) the determined TDD configuration is applied by the mobile station for radio frames from n+1 to n+m, wherein m is an integer and m>=2, and the default TDD configuration is applied by the mobile station as of radio frame n+m+1, and preferably wherein the values of the indicators in subframes i, j in radio frames n+1 to n+m encode the default TDD configuration or do not encode a TDD configuration.

According to an advantageous embodiment of the invention which can be used in addition or alternatively to the above, the value of m is: 1) indicated to the mobile station based on a third value of the indicator in a third subframe k of radio frame n, or 2) preconfigured at the mobile station.

According to an advantageous embodiment of the invention which can be used in addition or alternatively to the above, the determined TDD configuration is considered valid, when for a radio frame n−1, the same TDD configuration as for radio frame n is encoded by setting the first and second value of the indicator in the first subframe i and second subframe j of the radio frame n−1.

According to an advantageous embodiment of the invention which can be used in addition or alternatively to the above, at least one of subframe i and subframe j is a subframe having less OFDM symbols available for downlink data than the other subframes of the radio frame n, preferably wherein i=1 and j=6 out of subframes 0-9 of the radio frame n.

The invention further provides a mobile station for processing a Time Division Duplex, TDD, configuration in a communication system, the TDD configuration defining uplink, downlink and special subframes for radio frames. A receiving section of the mobile station receives an indicator in a first subframe i of a radio frame n and receives the indicator in a second subframe j of the same radio frame n, wherein a first value of the indicator in the first subframe i of the radio frame n and the second value of the indicator in the second subframe j of the same radio frame n encode a TDD configuration. A processor of the mobile station determines a first value of the indicator in the first subframe i and a second value of the indicator in the second subframe j, and determines the TDD configuration based on the determined first and second value of the indicator.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take a value of either 1, 2 or 3, wherein i=1 and j=6 out of subframes 0-9 of a radio frame. The TDD configuration is encoded by setting at least one of the value of the CFI in the first and second subframes i, j to the value 3. The processor determines whether at least one of the two CFIs in the respective subframes i and j of radio frame n has the value 3. In case at least one of the two CFIs in the respective subframes i and j of radio frame n has the value 3, the processor determines the TDD configuration based on the determined first and second value of the two CFIs. In case neither of the two CFIs in the respective subframes 1 and 6 of radio frame n has the value 3, the processor does not determine the TDD configuration but determines the control region length in the subframes 1 and 6 respectively based on the determined first and second value of the two CFIs.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take either the value of 1, 2 or 3, wherein i=1 and j=6 out of subframes 0-9 of a radio frame. The TDD configuration is encoded by setting the value of the CFI in the first and second subframes i, j to one of the values 1 or 2. The processor determines the TDD configuration based on the determined first and second value of the CFI. The processor determines the control region length in the subframes i and j respectively based on the first and second value of the CFIs.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take either the value of 1, 2 or 3, wherein i=1 and j=6 out of subframes 0-9 of a radio frame. The TDD configuration is encoded by setting the value of the CFI in the first and second subframes i, j, to one of the values 1, 2 or 3. The processor determines the control region length in the first and second subframes i, j of radio frame n based on: 1) a predetermined control region length, set for the first and second subframe i, j respectively of radio frame n, 2) the value of the CFI in the first and second subframes i, j respectively, when the CFI value is 1 or 2, or 3) a length value of a Physical HARQ, Hybrid Automatic Repeat Request, Indicator Channel, PHICH in the respective subframe i, j.

According to an advantageous embodiment of the invention which can be used in addition or alternatively to the above, the processor is adapted to determine at least subframes 0-4 out of subframes 0-9 of a radio frame to be either uplink, downlink or special subframes based on only the determined first value of the indicator in the first subframe i. In addition or alternatively, the processor determines at least subframes 5-7 out of subframe 0-9 of a radio frame to be either uplink, downlink or special subframes based on only the determined second value of the indicator in the second subframe j.

According to an advantageous embodiment of the invention which can be used in addition or alternatively to the above, wherein the mobile station is configured with a default TDD configuration. Either, the processor applies the determined TDD configuration for radio frame n+m, wherein m is an integer and m>=1, or the processor applies the determined TDD configuration for radio frames from n+1 to n+m, wherein m is an integer and m>=2, and processor is further adapted to apply the default TDD configuration as of radio frame n+m+1.

According to an advantageous embodiment of the invention which can be used in addition or alternatively to the above, the processor determines a third value of the indicator in a third subframe k of radio frame n, and determines the value of m based on the determined third value of the indicator in the third subframe k. Alternatively, the processor determines the value of m based on a preconfigured value in the mobile station.

According to an advantageous embodiment of the invention which can be used in addition or alternatively to the above, the processor determines the TDD configuration of radio frame n−1 based on a first and second value of the indicator in the first and second subframe i, j of radio frame n−1. The processor applies the TDD configuration determined from the radio frame n only when the TDD configuration determined from the radio frame n−1 is the same TDD configuration determined from the radio frame n.

The present invention further provides a base station for indicating a Time Division Duplex, TDD, configuration to a mobile station in a communication system, the TDD configuration defining uplink, downlink and special subframes for radio frames. A processor of the base station determines a TDD configuration, and sets a first value of an indicator in a first subframe i of a radio frame n and sets a second value of the indicator in a second subframe j of the same radio frame n to encode the determined TDD configuration. A transmitter of the base station transmits the radio frame to the mobile station, including the indicator in the first subframe i and the indicator in the second subframe j.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take a value of either 1, 2 or 3, wherein i=1 and j=6 out of subframes 0-9 of a radio frame. The processor sets at least one of the value of the CFI in the first and second subframes i, j to the value 3 when encoding the determined TDD configuration. The processor determines a control channel region length for respectively the first and second subframes i, j. The processor sets the value of the CFI in the first and second subframes i, j to one of either 1 or 2, based on the determined control channel region length for respectively the first and second subframes i,j.

According to an advantageous embodiment of the invention which can be used in addition or alternatively to the above, the processor associates the TDD configuration, of the first CFI value being 3 and the second CFI value being 3, with a TDD configuration that is used the least probable as a TDD configuration by the base station.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take either the value of 1, 2 or 3, wherein i=1 and j=6 out of subframes 0-9 of a radio frame. The processor sets the value of the CFI in the first and second subframes i, j to one of the values 1 or 2 for encoding the determined TDD configuration. The processor and a transmitter transmit control channels in the subframes i and j based on respectively the first and second value of the CFIs.

According to an advantageous embodiment of the invention which can be used in addition or alternatively to the above, the indicator is a control format indicator, CFI, intended to be used in a downlink or special subframe for indicating a control region length in said downlink or special subframe, in a unit of OFDM symbols. The CFI can take either the value of 1, 2 or 3, wherein i=1 and j=6 out of subframes 0-9 of a radio frame. The processor sets the value of the CFI in the first and second subframes i, j, to one of the values 1, 2 or 3 for encoding the determined TDD configuration. The processor and a transmitter transmit control channels in the subframes i and j based on: 1) a predetermined control region length, set for the first and second subframes i, j respectively of radio frame n, 2) the value of the CFI in the first and second subframes i, j respectively, when the CFI value is 1 or 2, or 3) a length value of a Physical HARQ, Hybrid Automatic Repeat Request, Indicator Channel, PHICH in the respective subframe i, j.

According to an advantageous embodiment of the invention which can be used in addition or alternatively to the above, the mobile station is configured with a default TDD configuration, and 1) the processor applies the determined TDD configuration for radio frame n+m, wherein m is an integer and m>=1, or 2) the processor applies the determined TDD configuration for radio frames from n+1 to n+m, wherein m is an integer and m>=2, and the processor applies the default TDD configuration as of radio frame n+m+1.

According to an advantageous embodiment of the invention which can be used in addition or alternatively to the above, the processor determines the value m, and the processor encodes the determined value of m into a third value of the indicator in a third subframe k of radio frame 2.

BRIEF DESCRIPTION OF THE FIGURES

In the following the invention is described in more detail with reference to the attached figures and drawings.

FIG. 7 illustrates the channel coding of the Control Format Indicator, FIG. 8 list the code words for each of the four CFI values, 1-4, FIG. 9 shows the seven currently-standardized TDD UL/DL configurations 0-6, the respective definitions of the 10 subframes and their switch-point periodicity, FIG. 10 illustrates the structure of a radio frame, being composed of two half-frames and 10 subframes, for a 5 ms switch-point periodicity, FIG. 11 illustrates a basic flow diagram for the functioning of the mobile station according to an embodiment of the invention, FIG. 12 is a table listing the possible CFI values 1, 2, 3 and the resulting TDD code points that are available, with a further indication which TDD code points are composed by valid/invalid CFI values depending on the particular subframes i, j used to carry the CFI, FIG. 13 is a table listing the possible CFI values 1, 2, 3, 4, and the resulting TDD code points that are available, with a further indication which TDD code points are composed by valid/invalid CFI values depending on the particular subframes i, j used to carry the CFI, FIG. 14 is a table listing the available TDD code points for encoding the dynamic TDD configuration indication according to one variant of a first embodiment, assuming at least one invalid CFI value (here value 4) is making up the codepoint, when being carried by subframes others than 1 and 6, FIG. 15 is a table similar to FIG. 14 listing the available TDD code points for encoding the dynamic TDD configuration indication according to another variant of the first embodiment, assuming at least one invalid CFI value (here values 3 and 4) is making up the codepoint, when being carried by subframes 1 and 6, FIG. 16 is a table similar to FIGS. 14 and 15, listing the available TDD code points for encoding the dynamic TDD configuration indication according to another variant of the first embodiment, assuming at least one invalid CFI value (here value 4) is making up the codepoint, when being carried by subframes 1 and 6, FIG. 17 is a table similar to FIG. 16, listing the available TDD code points for encoding the dynamic TDD configuration indication according to another variant of the first embodiment, assuming at least one invalid CFI value (here value 3) is making up the codepoint, when being carried by subframes 1 and 6, FIG. 18 is a table based on the table of FIG. 17 further listing one example of how the TDD configurations 1-5 can be associated with the available five TDD code points, FIGS. 20 and 21 illustrate for which radio frames the dynamic TDD re-configuration is applied by the mobile station according to the first embodiment, FIG. 22 is a table listing the available TDD code points for encoding the dynamic TDD configuration indication according to one variant of a second embodiment, assuming only valid CFI values are making up the codepoint, when being carried by subframes 1 and 6, FIG. 23 is a table listing the available TDD code points for encoding the dynamic TDD configuration indication according to another variant of the second embodiment, assuming only valid CFI values are making up the codepoint, when being carried by two subframes out of {0, 2-5, 7-9}, FIG. 24 is a table based on the table of FIG. 22 further listing one example of how the TDD configurations 0, 2, 4 and 5 can be associated with the available four TDD code points, FIG. 25 illustrates a flow chart for the functioning of the mobile station regarding control region length determination and dynamic TDD re-configuration according to one variant of the second embodiment, FIG. 26 illustrates for which radio frames the dynamic TDD re-configuration is applied by the mobile station according to the second embodiment, assuming that only the subsequent radio frame adopts the TDD re-configuration, FIG. 27 illustrates for which radio frames the dynamic TDD re-configuration is applied by the mobile station according to the second embodiment, assuming that the two subsequent radio frames adopt the TDD re-configuration, FIG. 28 is a table listing the available TDD code points for encoding the dynamic TDD configuration indication according to a variant of a third embodiment, assuming all CFI values are making up the TDD code points, FIG. 29 illustrates a table listing one example of how the TDD configurations can be associated with the available TDD code points as introduced in connection with FIG. 28, according to one variant of the third embodiment, FIG. 32 is a table illustrating the TDD configurations, as introduced in connection with FIG. 9, and further indicating that for subframes 0, 1, 2 and 5 the uplink/downlink configuration is already fixed, FIG. 33 is a table illustrating for the first of the two CFI values in subframe i, encoding the dynamic TDD re-configuration, an example association where the first subframes 0-5 are fixed by this first CFI value, according to a further embodiment, FIG. 34 is a table illustrating for the second of the two CFI values in subframe j, encoding the dynamic TDD re-configuration, an example association where the subframes 6-7 and partly 8 and 9 are fixed by this second CFI value, according to this further embodiment, FIG. 35 is a table illustrating how the subframes 8 and 9 are unambiguously fixed for the second CFI value being=1, in conjunction with the first CFI value in subframe i, according to this further embodiment, and FIG. 36 is a table illustrating one example of how the TDD configurations can be associated with the available TDD code points, according to this further embodiment.

DETAILED DESCRIPTION OF THE INVENTION

Figure 1:
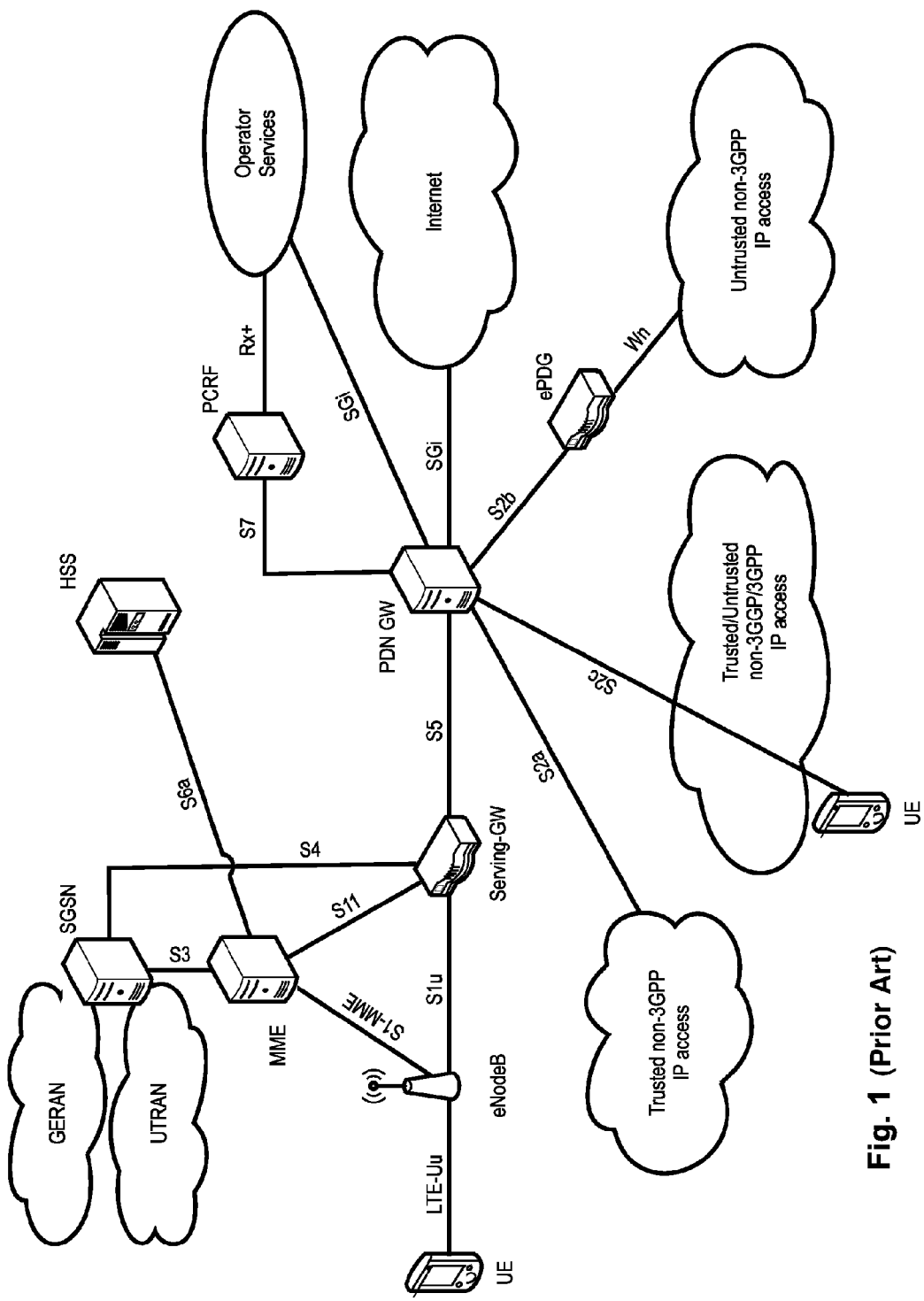
FIG. 1 shows an exemplary architecture of a 3GPP LTE system.
Figure 2:
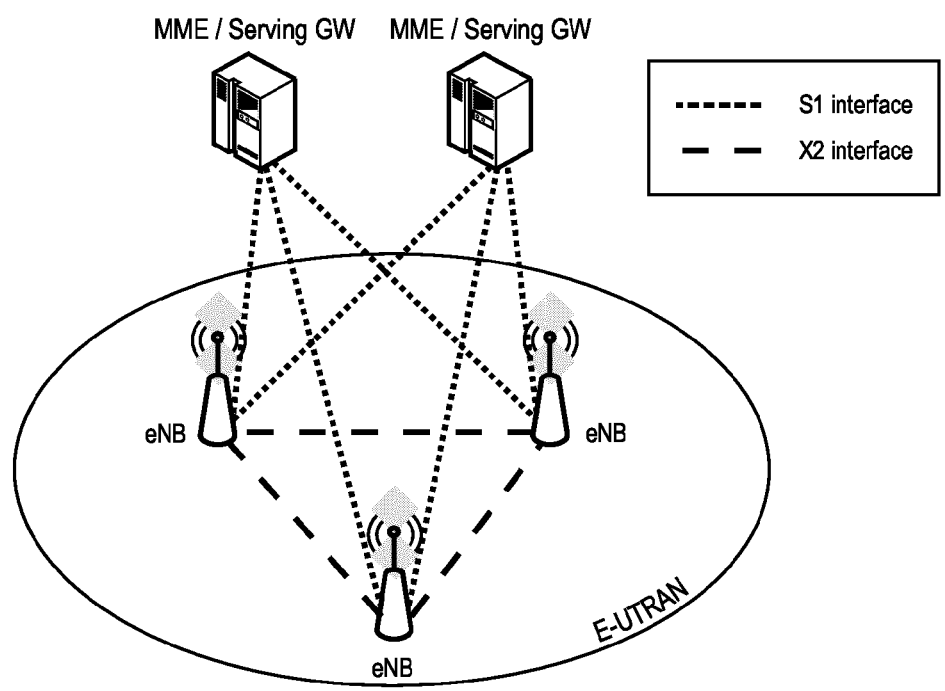
FIG. 2 shows an exemplary overview of the overall E-UTRAN architecture of 3GPP LTE.
Figure 3:
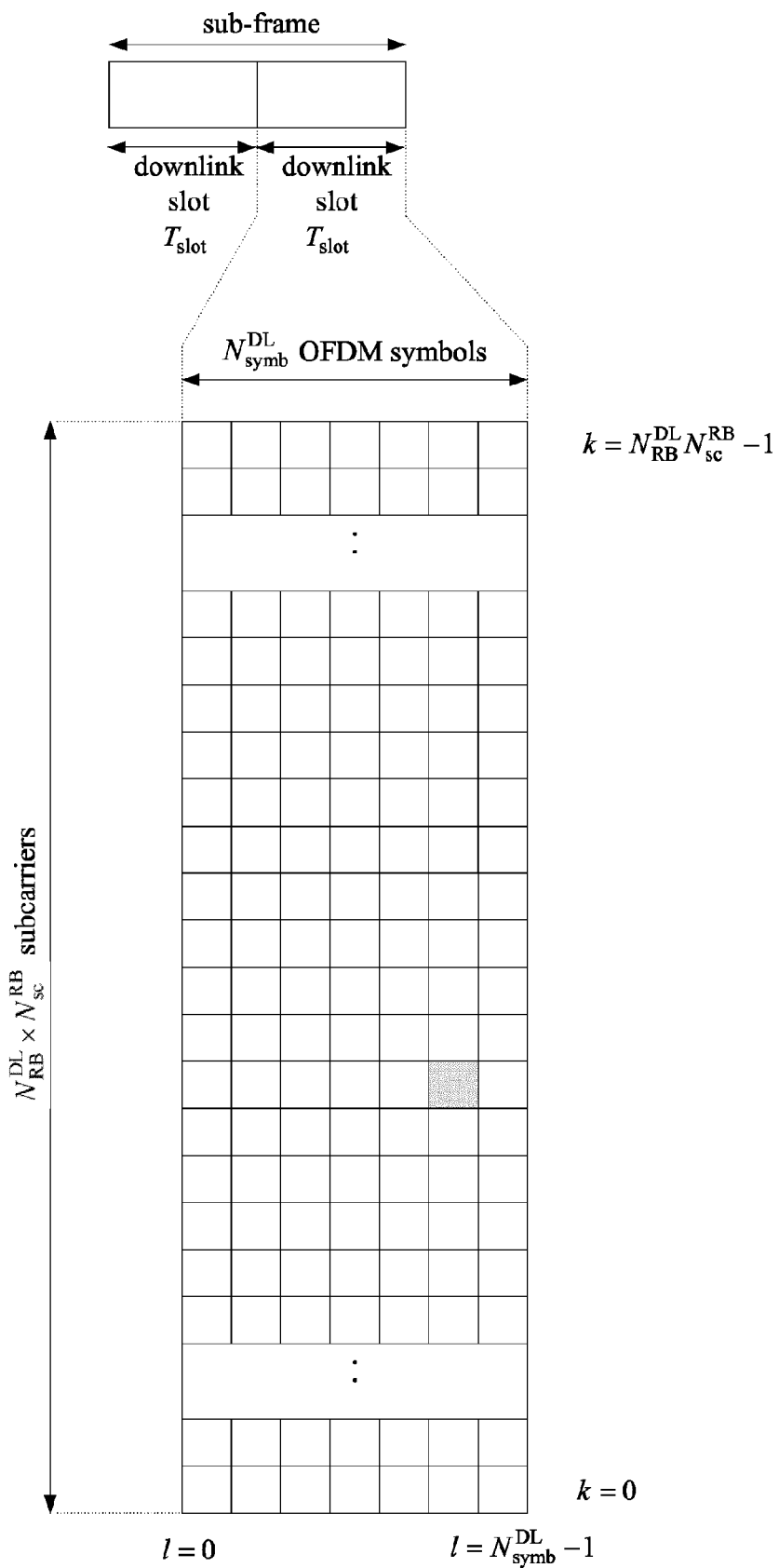
FIG. 3 shows exemplary subframe boundaries on a downlink component carrier as defined for 3GPP LTE (Release 8/9)
Figure 4:
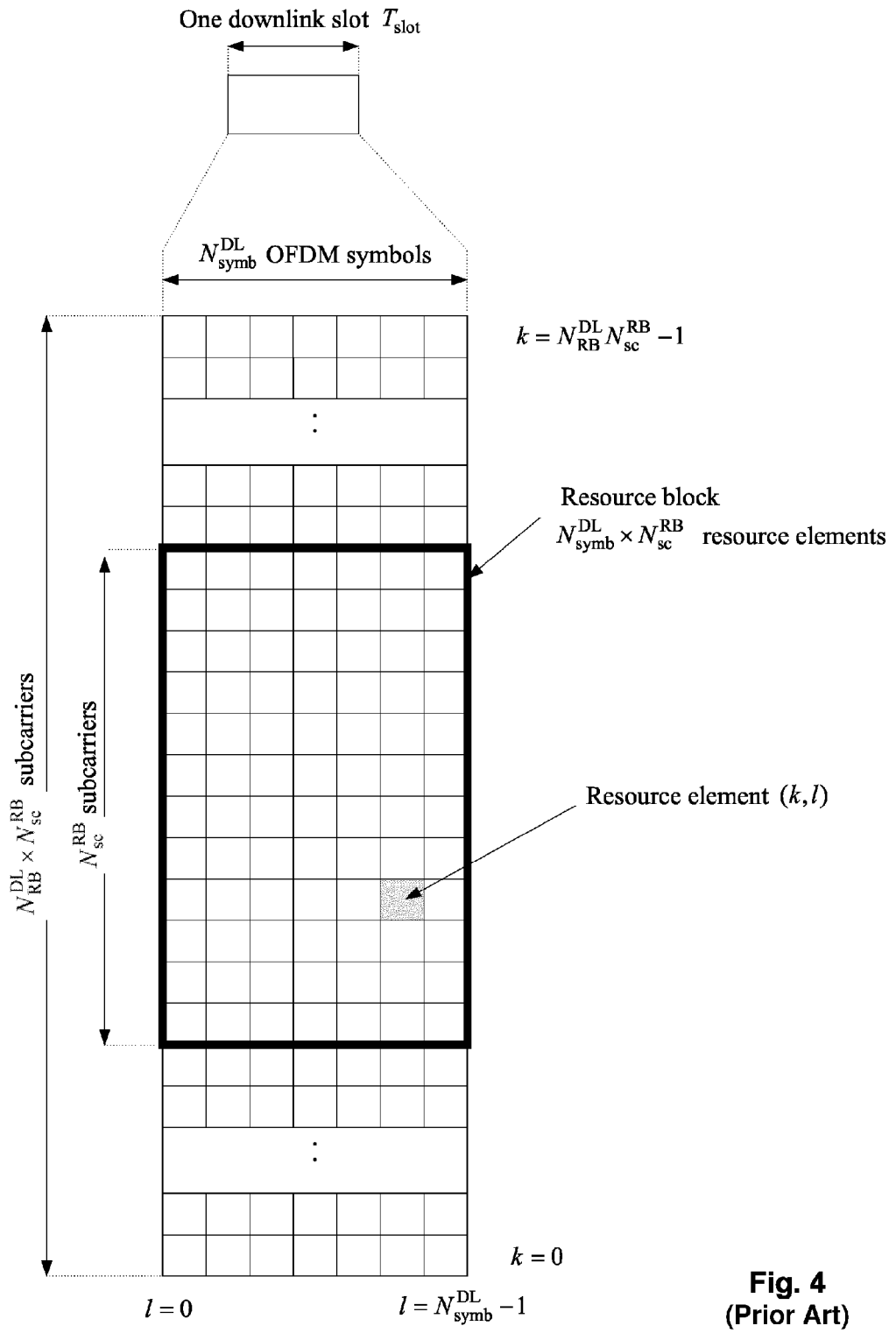
FIG. 4 shows an exemplary downlink resource grid of a downlink slot as defined for 3GPP LTE (Release 8/9), FIG. 5 exemplifies the structure of a normal subframe, respectively a physical resource block pair thereof.
Figures 5, 6:
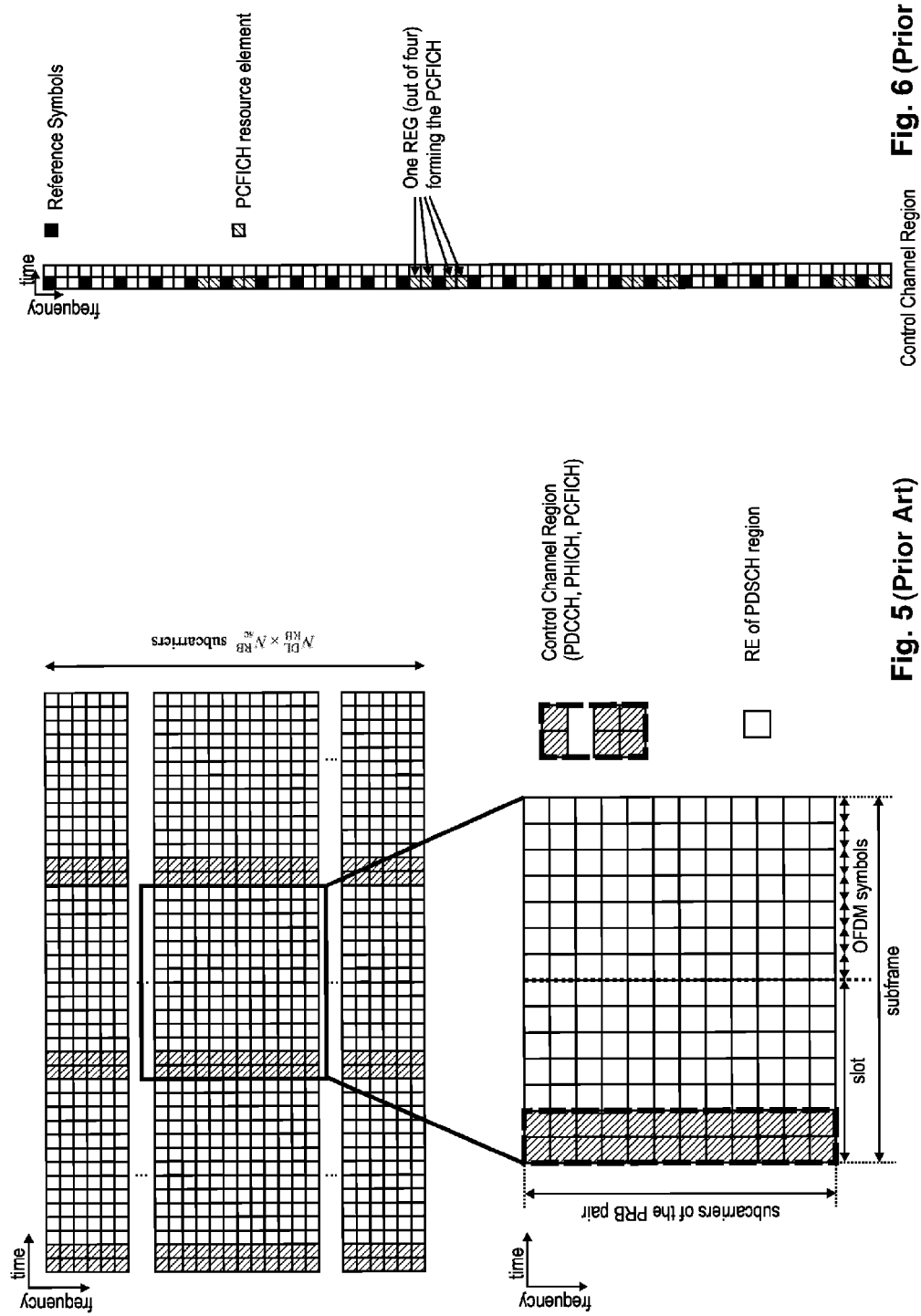
FIG. 6 illustrates the positions of the four REGs and their four REs forming the PFICH in the control channel region.

The following paragraphs will describe various embodiments of the invention. For exemplary purposes only, most of the embodiments are outlined in relation to a radio access scheme according to 3GPP LTE (Release 8/9) and LTE-A (Release 10/11) mobile communication systems, partly discussed in the Technical Background section above. It should be noted that the invention may be advantageously used for example in a mobile communication system such as 3GPP LTE-A (Release 10/11/12) communication systems as described in the Technical Background section above, but the invention is not limited to its use in this particular exemplary communication networks.

The term "TDD configuration" refers to the TDD uplink/downlink configuration as defined in the current standard, where the TDD configuration defines for each subframe of a radio frame whether same is a downlink, uplink or special subframe. The term "TDD configuration index" is a number (currently 0-6) respectively associated with one out of the seven possible TDD UL/DL configurations, and is defined in the technical standards of 3GPP (see FIG. 9).

The term "default TDD configuration" used in the claims and also throughout the description refers to the TDD configuration that is semi-statically configured in the system by using the SIB1 as explained in the background section. Put differently, the default TDD configuration is that one TDD configuration broadcast to all UEs in the communication area of the base station using the conventional mechanism of the system information acquisition and change procedure. Of course, the "default TDD configuration" can also be changed during communication, albeit not as dynamically as with the current invention, but with a long time cycle. Nevertheless, changing a "default TDD configuration" can have an impact on some of the embodiments of the invention, such as when one of the TDD code points has to indicate the default TDD configuration; it can happen that an association between one of the CFI code points has to be updated when the default TDD configuration is changed.

The expression "intended to be used" in the claims shall define the usual purpose of the control format indicator, such as for legacy UEs or in other subframes than the ones chosen for indicating or encoding a TDD configuration; it does not necessarily mean, but also does not exclude, that the CFI is actually used for said intended purpose of indicating a control region length in a downlink or special subframe. Since an indicator, usually employed for a different purpose, is re-used for encoding the TDD configuration, specifying the usually intended purpose of said indicator (i.e. the CFI) defines this aspect of the invention.

In the following, several embodiments of the invention will be explained in detail. The explanations should not be understood as limiting the invention, but as a mere example of the invention's embodiments to better understand the invention. A skilled person should be aware that the general principles of the invention as laid out in the claims can be applied to different scenarios and in ways that are not explicitly described herein. Correspondingly, the following scenarios assumed for explanatory purposes of the various embodiments shall not limit the invention as such.

The following definitions are used throughout the description.

i, j, k is the subframe index within a radio frame, with i, j being an integer∈{0, 1, 2 . . . 9} n is an integer m is an integer

The invention in general refers to TDD configurations and in particular introduces a fast mechanism for dynamically changing the TDD configuration. As explained in the background section, the semi-static reconfiguration of the TDD configuration is slow and cumbersome and shall be enhanced by a dynamic process according to one of the various embodiments explained below.

One main aspect of the invention is that a base station dynamically indicates a TDD configuration to a mobile station by encoding the particular dynamic TDD configuration into two values of a particular indicator transmitted in two subframes of one radio frame. Put differently, in a radio frame two values of a particular type of indicator, in respectively two subframes of a radio frame, are used to jointly encode the TDD configuration. Thus, after processing the two indicators in the two subframes the mobile station can determine the TDD configuration based on these two indicator values.

The determined TDD configuration can then be applied as accorded. For instance, the dynamic TDD configuration is used in the next m radio frame(s), and after the m radio frame(s), the default TDD configuration is used again.

A basic flow chart for the functioning of this aspect in the mobile station is illustrated in FIG. 11, in accordance with the above.

In more specific embodiments of the invention, the indicator mentioned above for encoding the TDD configuration is the control format indicator. As explained in the Background Chapter with regard to FIGS. 7 and 8, the intended use of the CFI is defined in 3GPP TS 36.212 v11.0.0 Chapter 5.3.4 as being "an indicator for the time span, in units of OFDM symbols, of the DCI in that subframe of the corresponding DL cell"; in this time span, overall the PHICH, the PCFICH and the PDCCHs (where each PDCCH carries a DCI) are transmitted, so in other words, the CFI indicates the length of a control region at the beginning of a subframe (downlink and special subframe) in which the channels PHICH, PCFICH and PDCCHs are located. The CFI is always carried in the PCFICH.

According to the invention, the control format indicator transmitted in the PCFICH of two (downlink and/or special) subframes of a radio frame is reused for the purpose of indicating a change in TDD configuration to the mobile station(s) in the cell. In particular, two CFIs of a radio frame jointly encode the particular TDD configuration.

In general and almost independent from how the CFI is encoded (independent from the CFI encoding of first, second and third embodiment below), the CFI-encoded TDD re-configuration indication is exchanged as follows. The base station which control the TDD configuration in its cell, monitors data traffic in its cell for all UEs and thus can best decide on whether another TDD configuration would better match the current traffic situation. The base station thus decides on the particular TDD configuration matching the current traffic, and then determines the corresponding two CFI values. This may be done based on a table in the base station providing the information on the association between the TDD configurations and the corresponding CFI values encoding said TDD configurations. Subsequently, the base station sends the two CFI values, as explained above, within the PCFICH in the two selected subframes (e.g. 1 and 6) of a radio frame n.

It should be noted that the PCFICH is received by all UEs in the cell of the base station. The mobile station(s) receives the radio frame n and successively processes all subframes therein and thus also the CFI values indicated in the PCFICH of the particular two subframes. Naturally, the mobile station knows which two subframes carry the CFI values that jointly encode the dynamic TDD re-configuration. The mobile station may thus decode the TDD re-configuration, based on a stored table, that corresponds to the one stored in the base station. The thus decoded TDD re-configuration is then applied by the base station and the mobile station for at least one radio frame subsequent to radio frame n.

The above-mentioned tables in the mobile station and the base station with the associations between the TDD configurations and the CFI code points can be RRC configured at the beginning.

FIGS. 12 and 13 illustrate the CFI values in the two subframes i and j, the corresponding code points resulting therefrom and furthermore show which CFI values are valid depending on the subframe index. More specifically, in FIG. 12 it is assumed that only CFI values 1, 2 and 3 are used for encoding the TDD configuration, whereas for FIG. 13 it is assumed that all four available CFI values are used for encoding the TDD configuration. A CFI value is considered valid when said CFI value can usually be sent in that particular subframe, as defined by the current standard. Thus, the value 4 of the CFI is always invalid since same is considered reserved (see FIG. 8), and is never used to indicate the control channel region length. As explained in the Background Section and in connection with the Table 7.7-1 from 3GPP TS 36.211 v11.0.0, the CFI in subframes 1 and 6 only can take the values 1 and 2 (see corresponding Table); thus, other values than 1 and 2 (i.e. values 3 and 4) for the CFI are invalid for subframes 1 and 6. On the other hand, for the remaining subframes (0, 2-5, 7-9) the value 3 is valid too.

It is particularly advantageous if the subframes 1 and 6 carry the CFI values for allowing the dynamic TDD re-configuration. Subframe 1 is always a special subframe, i.e. the downlink capacity is always smaller than a regular downlink subframe. Subframe 6 is a special subframe for four (0-2, 6) out of the seven possible TDD configurations; subframe 6 for these four TDD configurations 0-2, 6 has also a downlink capacity that is smaller than a regular downlink subframe. In particular, the control channel region in those subframes 1 and 6 can only be 1 or 2 OFDM symbols long, so the PDCCH capacity is always more limited in those subframes.

As already explained, the usage of the CFI for new purposes may cause the legacy UE to assume a different control channel region length (in terms of OFDM symbols) than newer UEs would. Consequently, a wrong assumption on the control channel region length in a subframe would generally lead to an inability to correctly detect any physical control channel in that subframe. This in turn means that a legacy UE might not be able to read PDSCH assignments conveyed by means of downlink control information on a PDCCH in that subframe, and consequently that such a subframe is lost for the communication with a legacy UE—on the other hand, newer UEs can still use the subframe as desired. It is therefore beneficial if the potential loss particularly of downlink transmission capacity for legacy UEs is minimised. This is evidently the case in a subframe where fewer OFDM symbols are available for downlink than in other subframes, such as in a special subframe. In the seven existing TDD configurations, subframe 1 is always such a special subframe, whereas subframe 6 is a normal downlink subframe or a special subframe, depending on the TDD configuration. However, even if subframe 6 is a normal downlink subframe, the control region length in both subframes 1 and 6 is upper-bounded as 2 OFDM symbols. Therefore the PDCCH capacity is generally smaller than in other subframes (where a length of up to 3 or 4 OFDM symbols is allowed).

A generally reduced PDCCH capacity is another preferable criterion to find a suitable subframe for the TDD indicator transmission, because a smaller PDCCH capacity means that fewer UEs can be assigned for downlink transmission, so that in those subframes the relative loss of not being able to communicate with legacy UEs is generally (or in other words, on average when e.g. assuming that the control channel region length is statistically uniformly distributed between the allowed values) is smaller than it would be in other subframes.

First Embodiment

According to a first set of embodiments of the invention, at least one invalid CFI value is used to encode the TDD configuration into the CFI of two subframes in a radio frame. One advantage is that by indicating at least one invalid CFI value, the mobile station can infer that the CFI value combination indicates a TDD re-configuration; assuming that a base station would not send an invalid CFI value in the usual sense of indicating the control channel region length.

Depending on which two subframes of a radio frame are used to carry the two CFIs, the invalid CFI values vary as already explained in connection with FIGS. 12 and 13. FIGS. 14 to 17 illustrate the various possible CFI value combinations and resulting code points, depending on which two subframes are selected to carry the TDD configuration and depending on which CFI values are actually used.

In particular, for FIG. 14 it is assumed that subframes other than subframes 1 and 6 are used; i.e. i, j∈{0, 2-5, 7-9}. In this case, only CFI value 4 is invalid, since the remaining CFI values 1, 2 and 3 can be used to indicate the control channel region length in the corresponding subframe(s). Consequently, there are seven code points available as illustrated in FIG. 14.

In FIG. 15 it is assumed that subframes 1 and 6 carry the CFI values for encoding the dynamic TDD configuration. Considering that CFI values 3 and 4 are invalid for subframes 1 and 6, this yields a total of 12 available code points for TDD configurations.

FIG. 16 also illustrates the case where subframes 1 and 6 carry the CFI values; however, FIG. 16 differs from FIG. 15 in that only CFI value 4 is considered as the invalid CFI value (CFI value 3 is not used). Conversely, FIG. 17 illustrates the case where only CFI value 3 is considered as the invalid CFI value (CFI value 4 is not used). In both FIG. 16 and FIG. 17 five code points are available for the dynamic TDD re-configuration according to this first set of embodiments.

For illustration purposes, the following explanation focuses on the TDD code points of FIG. 17, where the reserved CFI value 4 is not considered and subframes 1 and 6 carry the CFI values and thus the dynamic TDD re-configuration.

FIG. 18 illustrates one of several possible associations between the available code points and the TDD configurations. In general, any five out of the seven possible TDD configurations can be selected for being indicated as the dynamic TDD configuration. As can be appreciated, not all of the seven TDD configurations can be indicated dynamically when using the code points as defined by FIG. 17 (or FIG. 16, when considering CFI value 4 instead of CFI value 3). For the embodiments as depicted in FIGS. 14 and 15, all TDD configurations can be indicated dynamically, since there are enough code points in said respect; in fact it is even possible to assign the same TDD configurations to multiple TDD code points.

Furthermore, the particular association between the code points and the five out of seven TDD configurations can be defined freely, as well; therefore, the association as shown in FIG. 18 is merely exemplary and can be any other variation in the order. For example, codepoint 1/3 could be associated with any of the TDD configurations 0-6; this applies similarly to the remaining code points, too.

Nevertheless, further benefits can be gained for particular TDD configurations and for particular associations between TDD configurations and code points, as will be explained.

Legacy UEs (i.e. UEs that are not capable of using the dynamic TDD re-configuration as explained in this invention) might not detect transmitted invalid CFIs in a subframe as invalid, since the legacy UE behaviour is not specified in said respect. Correspondingly, in case the legacy UE receives a CFI value 3 in subframe 1, it can assume that the CFI value 3 is not valid and that this CFI value 3 was erroneously received. Depending on legacy UE implementation, the legacy UE can either try to guess or estimate whether a CFI value 1 or 2 was transmitted and used in the particular subframe, and even might by chance guess right, since we assume that the base station would transmit the control channels assuming a control channel region length of either 1 or 2 OFDM symbols, even if it indicates a CFI value 3 (or 4). Or the mobile station guesses wrong and cannot decode the control channels. The mobile station may also blind decode, respectively trying CFI=1 and CFI=2; this however implies significantly more processing at the UE, and can usually be assumed to be not done in legacy UEs since the cost is likely to outweigh the potential benefits.

In order to reduce the impact on legacy UEs, the TDD code point having an invalid CFI value for both subframes should be avoided as much as possible. In more detail, code point 3/3 should be used the least frequency to encode a dynamic TDD re-configuration, because it has the most impact on legacy UEs, since the UE might not be able to read the control channels in both subframes. Thus, that TDD re-configuration out of the five selected TDD configurations that will presumably be used the least shall be associated with TDD code point 3/3; or alternatively such a code point is not used at all and therefore does not indicate any TDD configuration.

Another improvement relates to the selection of the five TDD configurations out of the seven possible TDD configurations. Since not all seven TDD configurations can be dynamically indicated using the TDD code points provided by the two CFIs according to FIG. 17, these five TDD configurations shall be selected as follows to gain more advantages.

Legacy as well as non-legacy UEs will use so-called reference signals to obtain Radio Resource Management (RRM) and Radio Link Monitoring (RLM) measurements, of which Reference Signal Received Power (RSRP) and Reference Signal Received Quality (RSRQ) are examples. These are basically used to obtain link quality measurements to detect for example which base station is received with the strongest signal or best quality, but also to detect when the signal from a connected base station is falling below a threshold to detect a Radio Link Failure (RLF). The reference signals for those measurements are transmitted by definition in the downlink, i.e. a legacy or new UE operated in TDD would assume that such reference signals are not present in uplink subframes. If therefore a legacy UE assumes from the default (=SIB1) TDD configuration that a DL subframe occurs, it will assume that reference signals are included; if however that subframe is dynamically reconfigured to an UL subframe for new UEs, the base station will not transmit reference signals therein. Consequently, the legacy would interpret some rather random received signal as a reference signal, which is erroneous and therefore can lead to substantial measurement inaccuracies, which might even lead to the erroneous declaration of an RLF condition.

Similarly, the UE uses reference signals in order to estimate channel quality and channel state information that is fed back to the base station for future link adaptation of e.g. the modulation and coding rate of downlink data transmissions. An error in this will usually lead to loss of capacity and/or increased error rates or need for retransmission of data. More information on RRM, RSRP, RSRQ can be found in LTE—The UMTS Long Term Evolution—From Theory to Practice, Edited by Stefanie Sesia, Issam Toufik, Matthew Baker, section 22, 22.3.1.1, 22.3.1.2; for RLM, see idem section 22.7; for channel quality feedback and link adaptation see idem section 10; for connection re-establishment due to RLF see idem sections 3.2.3.5 and 22.6.1.

Correspondingly, in order to minimize the impact on legacy UEs regarding these measurement errors and their effects, the default TDD configuration via the SIB1 should be rather uplink heavy, meaning that more uplink subframes than downlink subframes should be defined in the radio frame. For example, a TDD configuration associated with TDD configuration index 0 defines 6 uplink subframes compared to 2 downlink subframes in a radio frame. Similarly a TDD configuration associated with TDD configuration index 6 would also be a preferred candidate where same defines 5 uplink subframes compared to 3 downlink subframes in a radio frame.

In view of that the default TDD configuration would be uplink heavy, the five available dynamic TDD configurations should provide a wide variety of uplink/downlink ratios. When considering FIG. 9, it can be appreciated that TDD configuration of TDD configuration index 1 is a balanced TDD configuration with respectively four subframes in the downlink and uplink. TDD configurations with indices 2, 3, 4 and 5 are getting more downlink heavy with respectively uplink/downlink ratios of 2/6, 3/6, 2/7, 1/8 (see FIG. 9). Especially, the strong downlink heavy TDD configurations 4 and 5 are important to adapt to the main downlink traffic.

Therefore, in order to allow a variety of uplink/downlink ratios so as to be able to adapt to different traffic situations, a variation of the above embodiment assigns TDD configurations of TDD configuration indices 1, 2, 3, 4, and 5 to the five available code points. This improvement is depicted in FIG. 18, this however being only one example. As mentioned previously, the negative effect on legacy UEs can be expected to be largest if code point 3/3 is transmitted to encode a dynamic TDD re-configuration for non-legacy UEs. In case the default TDD configuration would be uplink-heavy, it is therefore preferred that code point 3/3 is used to indicate, if anything, a TDD configuration that is not occurring very often to adapt to the traffic situation in the cell. For example, if the traffic is indeed uplink heavy in a longer-term average, there is little need for any dynamic reconfiguration, so it is not important which configuration is indicated by code point 3/3. If the traffic is balanced in a longer-term average, then it is sufficient to operate with the default uplink-heavy configuration and strongly downlink-heavy configurations dynamically such that the average uplink/downlink ratio is rather balanced. In this sense, a balanced TDD configuration such as configuration #1 does not need to be used regularly, and is therefore a good candidate for the interpretation of code point 3/3. If the longer-term average traffic is rather downlink heavy even though the default configuration is uplink heavy, then a dynamic reconfiguration should be indicated quite often and it should indicate the rather strongly downlink-heavy configurations such as configurations #4 or #5. This makes again the balanced TDD configuration a suitable candidate for code point 3/3, since it is unlikely to be used in the cell. For similar considerations, in case of a downlink-heavy default configuration the balanced configuration would not be regularly required and likewise be represented by code point 3/3. In the balanced default configuration, the available code points should represent a good variety of uplink-heavy and downlink-heavy configurations. Since the current system defines more downlink-heavy configurations, it is acceptable that one of the downlink-heavy configurations is represented by code point 3/3, leaving at least two other code points that can be used for less negative effect on the legacy UEs to indicate downlink-heavy configurations to non-legacy UEs. The same consideration applies to the case if the question is whether a TDD configuration is represented at all by any code point; the considerations about how important a certain configuration is for being indicated shown here can be applied to determine what kind of configuration would not be (or would be least) required to be represented in the by the available code points at all mutatis mutandis. For example, if the default configuration is uplink-heavy or downlink-heavy, then the balanced configuration can be left completely unrepresented by any code point, i.e. not even being represented by code point 3/3, which might therefore not represent any dynamic reconfiguration at all. As explained, the most suitable configuration that is represented by code point 3/3 might depend on the characteristic of the default configuration. In a variant of this invention, it is therefore depending on the default TDD configuration which TDD configuration is represented by code point 3/3. The same considerations applies to the second and the third embodiments discussed below when considering which TDD configurations are most or least used to be represented by the available code points or by which code point.

Figure 19:
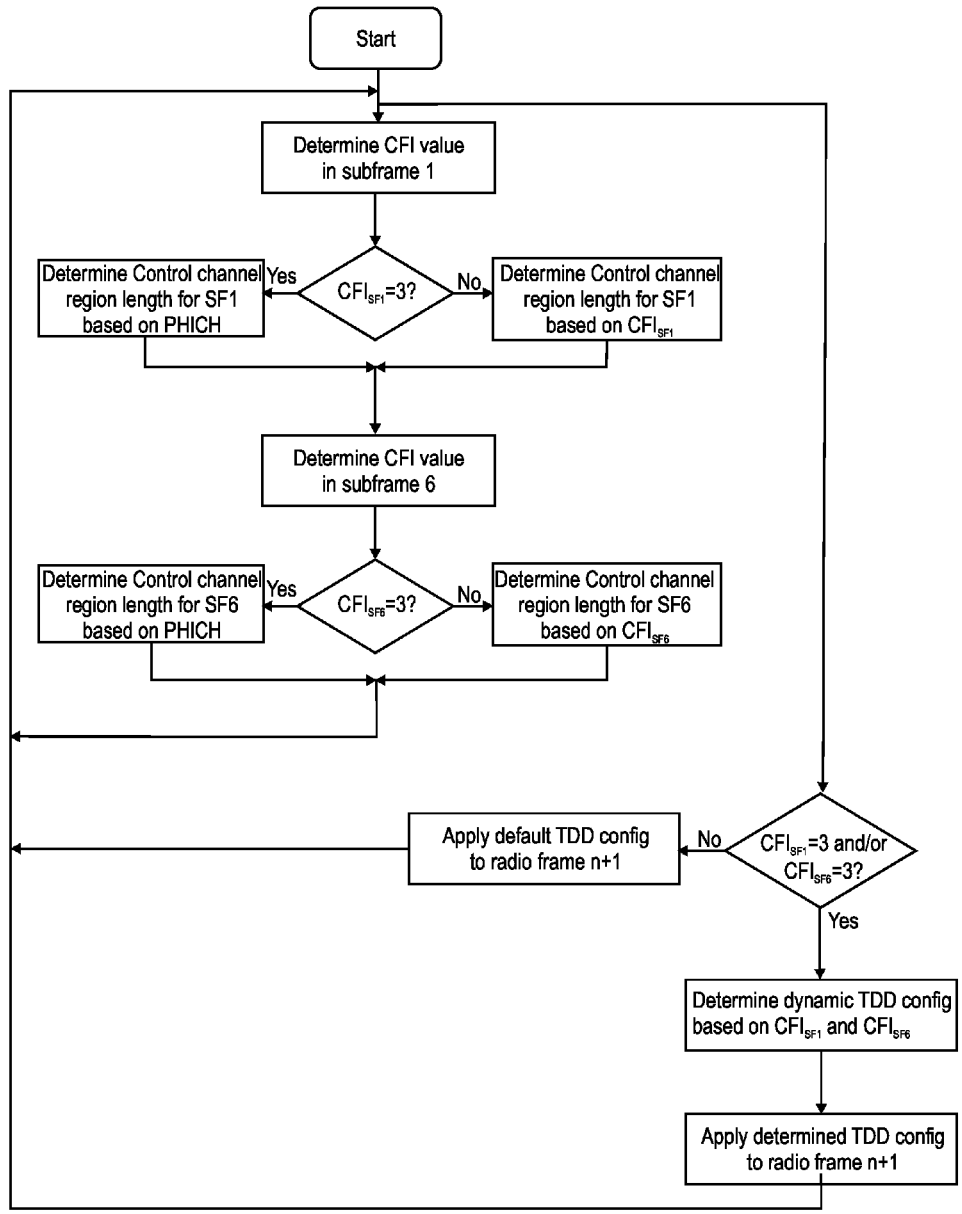
FIG. 19 is a flow chart for the functioning of the mobile station regarding control channel region length determination and dynamic TDD re-configuration according to one variant of the first embodiment.

FIG. 19 is a flow chart schematically illustrating the functioning of the mobile station with regard to receiving and processing CFI values in two subframes. With reference to FIG. 19, the following will explain how the mobile station can derive the control region length in a subframe and the dynamic TDD re-configuration according to one variant of the first embodiment of the invention. For the embodiment according to FIG. 19, it is assumed that subframes 1 and 6 carry the CFI-encoded dynamic TDD re-configuration according to TDD code points as defined by FIGS. 17 and 18 (i.e. using invalid CFI value 3, but not invalid CFI value 4). Nevertheless, the following applies accordingly to other assumptions too; such as, when using invalid CFI value 4 in combination with two subframes out of {0, 2-5, 7-9} to carry the CFI-encoded dynamic TDD re-configuration (see FIG. 14); or such as when using both invalid CFI values 3 and 4, as illustrated in FIG. 15; or such as, when using invalid CFI value 4, instead of invalid CFI value 3, as illustrated in FIG. 16.

Two processes are performed in the UE based on the CFI values in the subframes 1 and 6, which can be operated separately as exemplified in FIG. 19. In the one process, the UE determines the control channel region length for each subframe, in this case illustrated only for relevant subframes 1 and 6. The other process in the UE determines whether or not a dynamic TDD re-configuration is indicated by the CFI values and applies the corresponding appropriate TDD configuration. Those skilled in the art will perceive that these two processes can be operated in parallel, or in any sequence, as they are not mutually interacting.

The mobile station when receiving the subframes one by one, determines the CFI value given by the PCFICH in subframe 1, and checks whether the determined CFI value is invalid or not (i.e. =3?). In case the CFI value in subframe 1, $CFI_{SF1}$, is a valid CFI value, such as 1 or 2 (branch "No"), the mobile station determines the control channel region length for this subframe 1 based on the determined $CFI_{SF1}$ value; i.e. 1 or 2. On the other hand, in case the CFI value in subframe 1, $CFI_{SF1}$, is an invalid CFI value (branch "Yes"), the mobile station notices that this invalid CFI value cannot indicate the control channel region length as usual, and uses a different parameter for determining the control channel region length in subframe 1. In this particular example of FIG. 19, it is assumed that the mobile station determines the control channel region length based on the minimum length of the PHICH as it can be known from the master information block from a cell. This parameter is therefore known to both the base station and the mobile station as soon as a connection is established; correspondingly, the base station eNodeB can appropriately transmit the control channel in subframe based on the minimum length given for the PHICH, and the UE can read and correctly process the control channels based on the minimum length parameter for the PHICH.

Basically the same applies to the process of subframe 6, depending on whether the CFI value in said subframe is invalid or not (i.e. 3 or not). Correspondingly, if "No", a CFI value of 1 or 2 is used for determining the control channel region length in said subframe 6 as usual. A CFI value of 3 is ignored for determining the control channel region length in subframe 6; rather, the minimum length of the PHICH is used in said respect.

According to another process, the UE checks whether any of the two CFI values in subframes 1 and 6, i.e. $CFI_{SF1}$ or $CFI_{SF6}$, has an invalid value (i.e. value 3). If either $CFI_{SF1}$ and/or $CFI_{SF6}$ had the value 3, the UE assumes that a dynamic TDD re-configuration was intentionally indicated by the base station, and thus proceeds to determine the TDD configuration encoded into $CFI_{SF1}$ and $CFI_{SF6}$. Then, the thus determined TDD configuration is applied. If neither of the CFI values $CFI_{SF1}$, $CFI_{SF6}$, has the value 3, then no dynamic TDD re-configuration is assumed by the mobile station, and it thus continues to use the default TDD configuration which was configured by using the system information acquisition or change procedure.

The process in the mobile station is repeated for every radio frame.

In the above embodiment of FIG. 19 it is assumed that the dynamic TDD re-configuration is only to be applied to the next radio frame n+1; assuming that the current radio frame with the CFI-encoded dynamic TDD re-configuration is radio frame n. This is also illustrated in FIG. 20. Correspondingly, for radio frames n+2, n+3 . . . the default TDD configuration is used unless a different configuration would be indicated e.g. as outlined in the present invention.

However, this is only one example. More in general, the CFI-encoded dynamic TDD re-configuration can be applied to a radio frame n+m, where m is an integer ≥1; thus, considering a delay for applying this dynamic TDD re-configuration. Alternatively, the CFI-encoded dynamic TDD re-configuration can also be applied to more than one radio frame, i.e. from radio frame n+1 to radio frame n+m, where in this case m is an integer ≥2; or also with a delay. This is shown in FIG. 21. Correspondingly, for radio frames n+m+1, n+m+2 . . . the default TDD configuration is used.

The configuration time, i.e. the number of radio frames the dynamic TDD configuration applies, may be either pre-configured in the mobile station and the base station; e.g. only the subsequent radio frame to the one with the dynamic TDD configuration indication. Or, the configuration time may be indicated dynamically or semi-statically to the mobile station, too. This could be done e.g. by using the CFI value of another, third, subframe in the radio frame n, defining the value of e.g. m. Therefore, for example up to four different configuration times could be pre-configured and then indicated as needed; or to avoid a negative impact on legacy UEs only valid CFI values shall be used for indicating the configuration time, i.e only CFI values 1, 2 (or 3). The same consideration applies to the second and the third embodiments discussed below.

FIGS. 20 and 21 also illustrate an optional improvement to increase error resilience. In particular, the CFI-encoded dynamic TDD re-configuration indication can be aggregated over multiple radio frames. In other words, the identical TDD re-configuration is indicated over multiple radio frames, e.g. by indicating the same CFI value in subframe i of radio frame n and n+1, and by also indicating the same CFI value in subframe j of radio frame n and n+1. Of course, in order to further increase resilience the dynamic TDD re-configuration could be transmitted over more than two radio frames. In such an aggregation case the indicated TDD re-configuration should be applied only after the radio frame where the last instance of the repeated information is received; such knowledge about the number of radio frames repeating the TDD re-configuration indication is typically known or signalled prior to enabling the dynamic TDD configuration detection at the mobile station. The same consideration applies to the second and the third embodiments discussed below.

Second Embodiment

The second embodiment of the invention differs from the first embodiment explained above in that no invalid CFI value in the two subframes is used for encoding the dynamic TDD re-configuration. In other words, only valid CFI values are used for said purpose, whereas the first embodiment assumed that at least one invalid CFI value is used.

In FIGS. 22 and 23 the available TDD code points for this second embodiment are depicted, taking into account the different valid CFI values in the subframes 1, 6 on the one hand and subframes 0, 2-5, 7-9 on the other hand. In more detail, when assuming that subframes 1 and 6 carry the CFI-encoded dynamic TDD re-configuration indication, CFI values 1 and 2 are valid, while CFI value 3 is invalid; value 4 is invalid for every subframe and thus is not used in this second embodiment. This yields 4 available code points as depicted in FIG. 22.

In the remaining subframes 0, 2-5, 7-9 each of the three CFI values 1, 2, 3 is valid. Correspondingly, the total number of available TDD code points is 9, as depicted in FIG. 23. Though not explicitly depicted in a figure, when assuming that one CFI value in subframe 1 or 6 is used, and one CFI value in subframes 0, 2-5, 7-9 is used, there are 2×3=6 combinations or code points available In the following description of the second embodiment, the explanation of the functioning with regard to FIG. 23 is omitted, because it will be explained in greater detail in connection with the third embodiment.

One difference with regard to the first embodiment is that the mobile station is not able to distinguish a CFI-encoded dynamic TDD re-configuration from a standard control region length indication. Correspondingly, the mobile station has to assume that every CFI combination indicates a TDD configuration which it has to follow. Correspondingly, the mobile station has to determine the control channel region length and the dynamic TDD configuration based on the two CFI values for each radio frame. This is shown in the flow chart for the UE behaviour of FIG. 25.

Only four TDD code points are available for associating TDD configurations, wherein one out of various possible associations is given in the table illustrated of FIG. 24 (assuming that the two CFIs are carried in subframe 1 and 6). The selected TDD configurations of FIG. 24, as well as the particular associations with the TDD code points are mere examples. Any other association between these four TDD configurations and the TDD condepoints is possible. Furthermore, any four out of the total seven TDD configurations can be selected for the purpose of indicating same to the mobile station for dynamic TDD configuration change.

An improvement that can be achieved in the association of TDD configurations to the TDD code points made up by the two CFI values refers to the association of that TDD configuration, that will be used presumably the least in the cell, to the code point 1/1. The code point 1/1 allows the base station to only use 1 OFDM symbol to transmit the control channel in those subframes; this may be disadvantageous when the respectively 1 OFDM symbol is not enough. Therefore, by associating the least used TDD configuration with this code point 1/1, situations can be avoided where the base station is not able to send all control data in said subframe(s).

Assuming that the default TDD configuration is used and needs to be indicated regularly, it is beneficial if the indication of such a regularly used configuration is represented by a code point that at the same time offers sufficient PDCCH capacity. For example, in case that a CFI value is indicated in subframe 1 or 6 of a radio frame, CFI value 2 provides the largest control channel capacity; in other subframes, CFI value 3 provides the largest control channel capacity. It is therefore preferable if the default TDD configuration is represented by code point 2/2 in case of both CFI values being transmitted in subframes 1 and 6, or by code point 3/3 in case of both CFI values being transmitted in subframes other than 1 and 6, or by code point 2/3 or 3/2 in case of one CFI value being transmitted in subframes 1 or 6 and the other CFI being transmitted in subframes other than 1 and 6. As already mentioned in connection with the first embodiment, the least used dynamic TDD configuration may depend on the default TDD configuration. In case the default TDD configuration would be uplink-heavy, it is therefore preferred that code point 1/1 is used to indicate, if anything, a TDD configuration that is not occurring very often to adapt to the traffic situation in the cell. For example, if the traffic is indeed uplink heavy in a longer-term average, there is little need for any dynamic reconfiguration, so it is not important which configuration is indicated by code point 1/1. If the traffic is balanced in a longer-term average, then it is sufficient to operate with the default uplink-heavy configuration and strongly downlink-heavy configurations dynamically such that the average uplink/downlink ratio is rather balanced. In this sense, a balanced TDD configuration such as configuration #1 does not need to be used regularly, and is therefore a good candidate for the interpretation of code point 1/1. If the longer-term average traffic is rather downlink heavy even though the default configuration is uplink heavy, then a dynamic reconfiguration should be indicated quite often and it should indicate the rather strongly downlink-heavy configurations such as configurations #4 or #5. This makes again the balanced TDD configuration a suitable candidate for code point 1/1, since it is unlikely to be used in the cell. For similar considerations, in case of a downlink-heavy default configuration the balanced configuration would not be regularly required and likewise be represented by code point 1/1. In the balanced default configuration, the available code points should represent a good variety of uplink-heavy and downlink-heavy configurations. Since the current system defines more downlink-heavy configurations, it is acceptable that one of the downlink-heavy configurations is represented by code point 1/1, leaving at least two other code points that can be used for less negative effect on the legacy UEs to indicate downlink-heavy configurations to non-legacy UEs. The same consideration applies to the case if the question is whether a TDD configuration is represented at all by any code point; the considerations about how important a certain configuration is for being indicated shown here can be applied to determine what kind of configuration would not be (or would be least) required to be represented in the by the available code points at all mutatis mutandis. For example, if the default configuration is uplink-heavy or downlink-heavy, then the balanced configuration can be left completely unrepresented by any code point, i.e. not even being represented by code point 1/1, which might therefore not represent any dynamic reconfiguration at all. As explained, the most suitable configuration that is represented by code point 1/1 might depend on the characteristic of the default configuration. In a variant of this invention, it is therefore depending on the default TDD configuration which TDD configuration is represented by code point 1/1. The same considerations applies to the second and the third embodiments discussed below when considering which TDD configurations are most or least used to be represented by the available code points or by which code point.

As illustrated in FIG. 25, the mobile station applies the determined TDD configuration to the subsequent radio frame n+1. This is also depicted in FIG. 26 where depending on the particular determined TDD configuration the subsequent radio frame is configured with the corresponding TDD configuration as determined from the corresponding CFI values in the two subframes of the current radio frame. The changes as shown in FIG. 26 are of course arbitrary; any change of TDD configuration(s) can be indicated.

Alternatively, the determined CFI-encoded dynamic TDD configuration does not only apply to the subsequent radio frame n+1, but to several radio frames n+1 to n+m, where m is an integer ≥2. The case where m=2 is depicted in FIG. 27. In particular, the CFI-encoded dynamic TDD configuration indication in radio frame n−2 indicates to the mobile station that for radio frames n−1 and n the particular TDD configuration as determined from the two CFI values in radio frame n−2 is to be used; in the illustration example of FIG. 27, TDD configuration of TDD configuration index 2. In this particular variant of FIG. 27 the UE can ignore the CFI values of the two subframes in radio frame n−1 with regard to determining the TDD configuration, and only use them for determining the control channel region length in the particular subframes.

In a similar manner as for the first embodiment, the configuration time, i.e. the number of radio frames the dynamic TDD configuration applies, may be either pre-configured in the mobile station and the base station; e.g. only the subsequent radio frame to the one with the dynamic TDD configuration indication. Or, the configuration time may be indicated dynamically or semi-statically to the mobile station, too. This could be done e.g. by using the CFI value of another, third, subframe k in the radio frame n, defining the value of e.g. m.

In a similar manner as with the first embodiment, one improvement of this second embodiment is to aggregate the CFI-encoded dynamic TDD re-configuration indication over multiple radio frames, before the TDD re-configuration indication is actually applied. For instance, the same CFI value is indicated in subframe i of radio frame n and n+1, and the same CFI value is indicated in subframe j of radio frame n and n+1. Of course, in order to further increase resilience the dynamic TDD re-configuration could be transmitted over more than two radio frames. In such an aggregation case the indicated TDD re-configuration should be applied only after the radio frame where the last instance of the repeated information is received. In the first radio frame until the last radio frame out of the sequence of radio frames repeating the TDD re-configuration indication the previously-indicated TDD configuration is applied. The corresponding knowledge about the number of radio frames repeating the TDD re-configuration indication is typically known or signalled prior to enabling the dynamic TDD configuration detection at the mobile station. The same consideration applies to the third embodiment discussed below.

A further improvement to the second embodiment is that the default TDD configuration, currently being configured in the cell (by using the system information acquisition procedure and/or system information change procedure), shall be associated with one out of the four available TDD code points, e.g. with code point 1/1 as exemplified in FIG. 24 by using the TDD configuration of TDD configuration index 0 as the default TDD configuration. The main advantage from indicating the default TDD configuration with the dynamic TDD re-configuration mechanism is that the base station is able to drive all mobile stations in a cell (legacy UEs and new UEs supporting the dynamic TDD mechanism) with the same TDD configuration if necessary. Otherwise, since every CFI combination (i.e. two CFI values in two subframes i, j of a radio frame) is considered as a CFI-encoded dynamic TDD re-configuration indication by the mobile station, in case the default TDD configuration cannot be indicated dynamically, legacy UEs and new UEs always use a different TDD configuration which provides several disadvantages, such as interference caused by as well as caused to legacy and new UEs, potential issues related to measurements for legacy UEs as outlined previously, and even the potential case that in such a case broadcast information that should be received by legacy as well as new UEs cannot be transmitted in just one subframe, or at least that the choice of such subframes is greatly reduced (since such a subframe needs to be a subframe including downlink transmissions, i.e. would need to be "D" or "S" for the UEs), which affects the constraints or the on the base station scheduler or the transmission efficiency for the transmission of the respective broadcast information.

In this variant however only three TDD code points remain to be associated with other TDD configurations different from the default TDD configuration.

Similar as with the first embodiment, it is advantageous to have either TDD configurations of TDD configuration index 0 or 6 as the default TDD configuration in order to reduce the measurement errors caused in legacy UEs, as explained in detail before in connection with the first embodiment.

Furthermore, in case an uplink heavy default TDD configuration such as 0 or 6 is used, a further improvement of the second embodiment refers to having a balanced uplink/downlink and downlink heavy TDD configurations among those associated with the remaining TDD code points; this is similar to the corresponding improvement of the first embodiment. In particular, the three available TDD code points should be associated with corresponding three TDD configurations out of TDD configurations 1-5. FIGS. 24, 26 and 27 assume as an example that TDD configurations 2, 4 and 5 are selected.

Third Embodiment

In contrast to the previous embodiments, whether or not a CFI value is valid is not considered according to the third embodiment. Rather, the CFI values 1, 2 and 3 are used for the CFI-encoded dynamic TDD re-configuration irrespective of whether the CFI values are invalid for a particular subframe or not. Correspondingly, 9 TDD code points are available, as illustrated in FIG. 28, for being associated with the seven TDD configurations. When considering the CFI values 1, 2, 3 and 4, 16 code points would be available, as depicted in FIG. 13. In view of that only 7 TDD configurations need to be indicated, the following discussion of the third embodiment focuses on the use of "only" the three CFI values, 1, 2, 3.

FIG. 29 illustrates an exemplary association of the seven TDD configurations to the 9 TDD code points made up by the two CFIs. The association of FIG. 29 is an example, and the skilled person is capable of choosing any other possible association.

As with the previous embodiments, the base station indicates a dynamic TDD re-configuration depending on the traffic situation using the two CFI values of the two subframes in a radio frame n.

Figure 30:
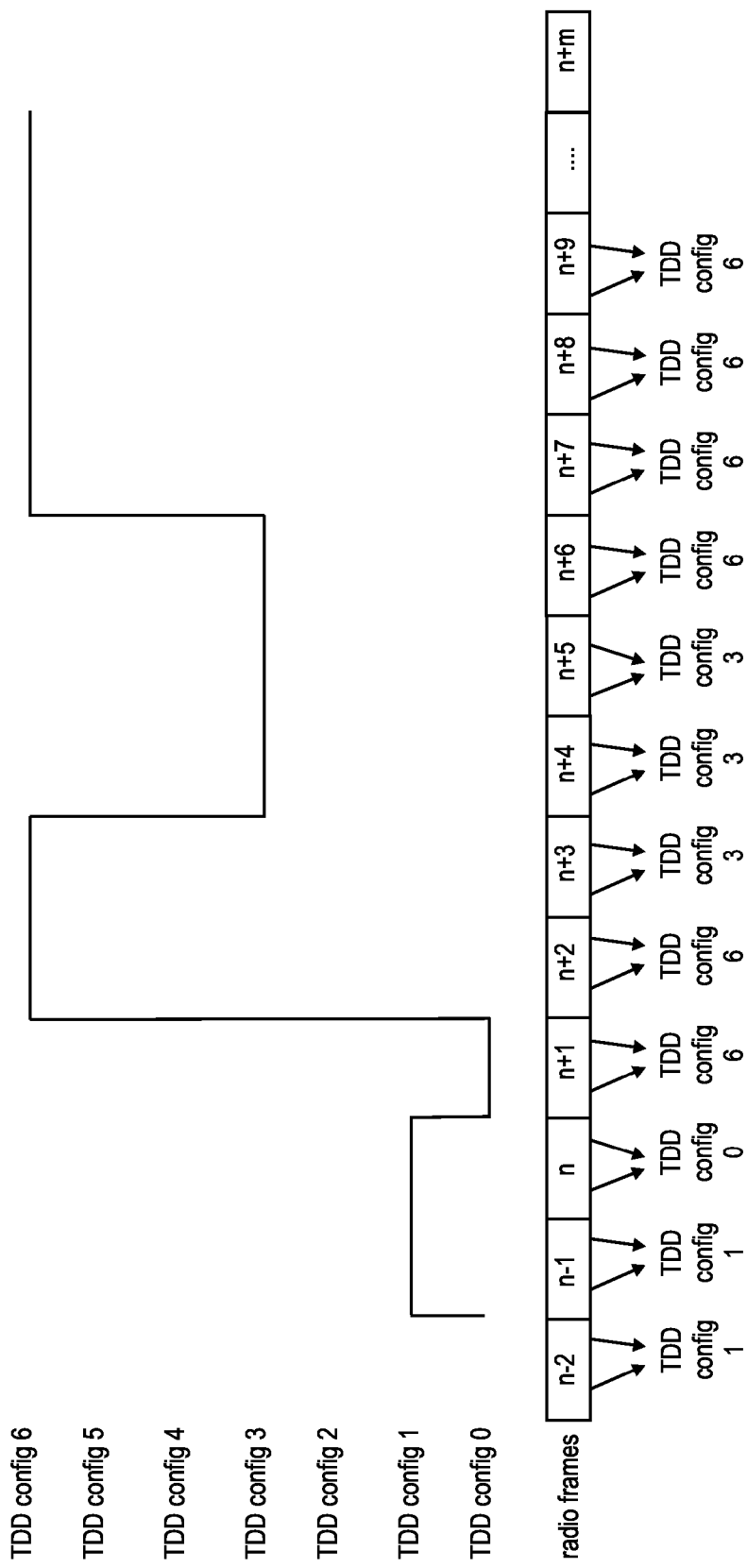
FIG. 30 illustrates for which radio frames the dynamic TDD re-configuration is applied in the system according to the third embodiment, assuming that the TDD re-configuration is applied to the next radio frame only.

In this embodiment, the CFI combination of two subframes indicates a dynamic TDD re-configuration for each radio frame since there is no possibility for the UE to distinguish the dynamic TDD re-configuration from the CFI values alone. The UE thus always needs to follow this CFI-encoded dynamic TDD re-configuration indication. This is depicted in FIG. 30, where each radio frame n−2 to n+9 indicates a particular TDD config, which is applied in the system to respectively the next radio frame only. In other words, the "TDD config 0" indication received in radio frame n is thus applied only to radio frame n+1; for radio frame n+2, the TDD config 6 of radio frame n+1 is applied. FIG. 30 shows merely an example of a dynamic TDD re-configuration.

In this third embodiment, similar to the second embodiment, the CFI value in these two particular subframes may be used for two different purposes; the usual CFI purpose of indicating the control channel region length in the subframe and the dynamic TDD re-configuration. For valid values of the CFI in a subframe, the base station may transmit the control channels (i.e. PCFICH, PHICH, PDCCH) according to said CFI value that is also used to encode the TDD configuration. Correspondingly, for instance if the base station wants to indicate the TDD configuration of code point 3/2 (corresponds to TDD configuration 6 in the example of FIG. 29), the CFI value 3 is transmitted in the first subframe i (i.e. i=2) and the CFI value 2 is transmitted in the second subframe j of the radio frame n (i.e. j=7). Since the CFI value 3 is a valid CFI value in subframe 2, the base station will transmit the control channels in the first 3 OFDM symbols of said subframe 2, in accordance with the CFI value=3 in the PCFICH of said subframe 2. This correspondingly applies to subframe 7 and the CFI value 2.

For a different case where i=1 and j=6, the CFI value 3 is invalid for subframe 1. Therefore, the base station does not transmit the control channel according to the transmitted CFI value, but takes the minimum length indicated by the corresponding PHICH parameter as reference for the control channel region length in that subframe 1. Likewise, the mobile station determines whether the CFI value is invalid, and in said case, also takes the PHICH minimum length parameter into account for determining the control channel region length, and may thus correctly decode the control channels in said subframe 1.

Figure 31:
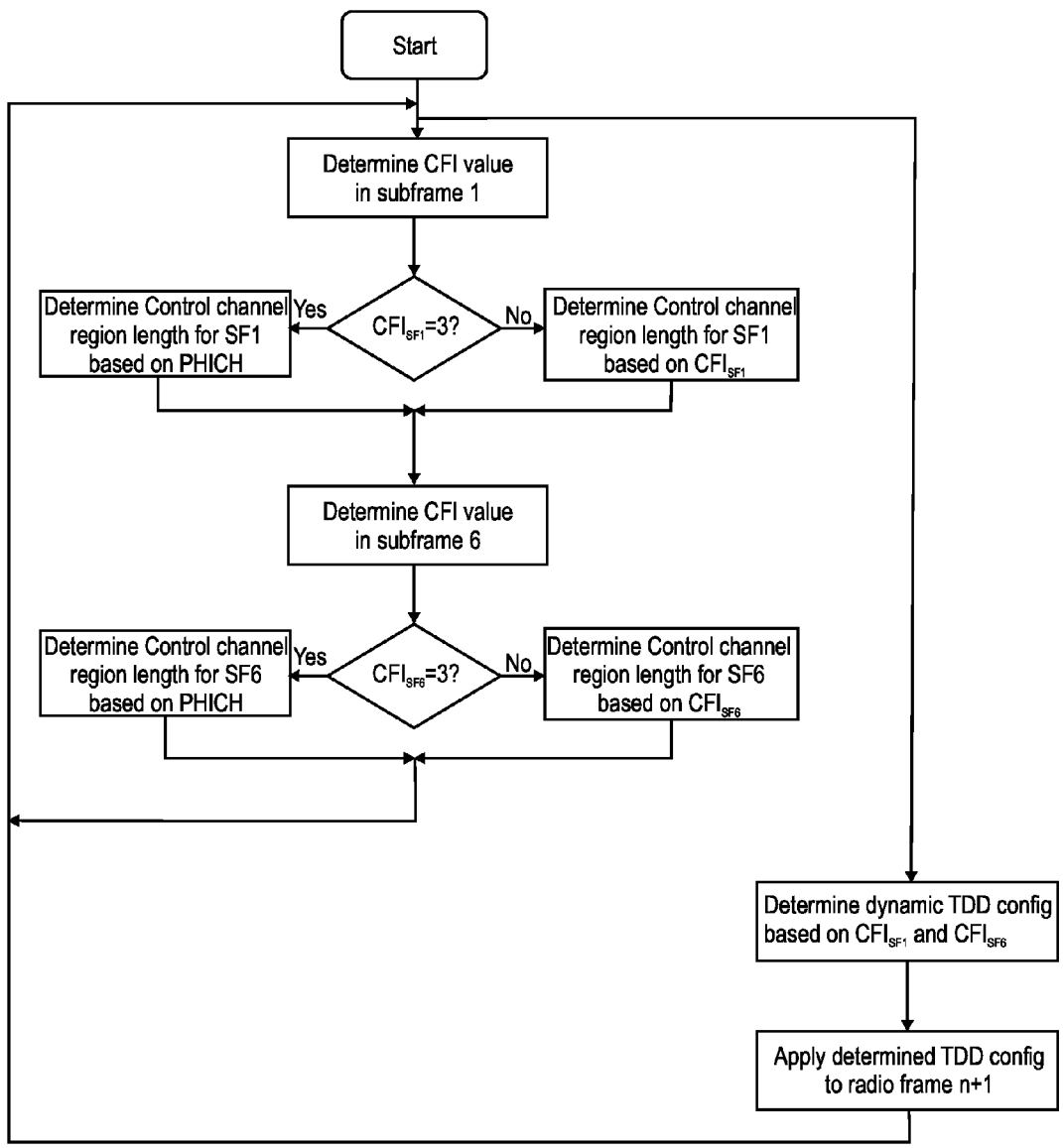
FIG. 31 is a flow chart for the functioning of the mobile station regarding control region length determination and dynamic TDD re-configuration according to one variant of the third embodiment.

This UE behavior is depicted in FIG. 31 for the example just mentioned, namely subframe i=1 and subframe j=6. As apparent from FIG. 31, depending on whether a value is invalid (i.e. =3) or not, the mobile station determines the control channel region length of that subframe based on the CFI value or differently based on the minimum PHICH length.

Furthermore, independent of the validity of the CFI value(s), the mobile station determines always a dynamic TDD configuration from the two CFI values in the two subframes of each radio frame. Also, in FIG. 31 it is assumed that the determined TDD configuration is applied to the next radio frame n+1 only.

In a variant of this third embodiment, the mobile station determines a dynamic TDD configuration from the two CFI values in the two subframes of radio frame n, and applies this dynamic TDD configuration during various later radio frames n+1 up to n+m. In those radio frames n+2 to n+m−1 the two CFI values in the subframes i and j are not used to encode the dynamic TDD re-configuration, since the previously-indicated dynamic TDD configuration is still valid for the next radio frame(s). Instead, all CFI values (i.e. also the two CFI values of subframes i, j) of these radio frames n+2 to n+m−1 are used as in the standard, i.e. to indicate the control channel region length of said subframe. Radio frame n+m then includes the next dynamic TDD re-configuration indication encoded into the CFI values of its subframes i, j.

In further variants of this third embodiment, the CFI code point 3/3 should be avoided to minimize the impact of invalid CFI values on legacy UEs; this was already explained in detail with regard to the previous embodiments and further detailed will thus be omitted with reference to the corresponding passages. Since in the particular embodiment more code points than TDD configurations are available, it is not necessary to associate the least used TDD configuration with the code point 3/3, but simply the code point 3/3 is not associated with any of the TDD configurations. Consequently, code point 3/3 will not be effectively used in the system, thus avoiding the most severe impact on legacy UEs. This is also illustrated in the example table of FIG. 29, where the code point 3/3 is not associated with any TDD configuration. Similarly, the code point 2/3 remains reserved in this example, since subframe 6 can be a full "D" subframe, unlike subframe 1.

In the same manner as with the second embodiment, one improvement of this third embodiment is to aggregate the CFI-encoded dynamic TDD re-configuration indication over multiple radio frames, before the TDD re-configuration indication is actually applied. For instance, the same CFI value is indicated in subframe i of radio frame n and n+1, and the same CFI value is indicated in subframe j of radio frame n and n+1. Of course, in order to further increase resilience the dynamic TDD re-configuration could be transmitted over more than two radio frames. In such an aggregation case the indicated TDD re-configuration should be applied only after the radio frame where the last instance of the repeated information is received. In the first radio frame until the last radio frame out of the sequence of radio frames repeating the TDD re-configuration indication the previously-indicated TDD configuration is applied. The corresponding knowledge about the number of radio frames repeating the TDD re-configuration indication is typically known or signalled prior to enabling the dynamic TDD configuration detection at the mobile station.

The invention according to the previous three embodiments and their variants has several advantages, as already mentioned throughout the above description of the embodiments. First of all, a fast and dynamic TDD re-configuration is implemented; further using no new signal or channel in said respect. The effect on legacy UEs is strictly limited to 2 (i, j) out of 10 subframes. Furthermore, even in those 2 subframes, the impact on legacy UEs may be minimized by the above-mentioned mechanisms.

Using subframes 1 and 6 in a radio frame is particularly advantageous as already set out before; subframe 1 is always a special subframe, i.e. the downlink capacity is always smaller than a regular downlink subframe. Subframe 6 is a special subframe for four (0-2, 6) out of the seven possible TDD configurations; subframe 6 for these four TDD configurations 0-2, 6 has also a downlink capacity that is smaller than a regular downlink subframe. In particular, the control channel region in those subframes 1 and 6 can only be 1 or 2 OFDM symbols long, so the PDCCH capacity is always more limited in those subframes.

Further Optimization

In the following a further optimization will be explained that can be combined with any of the previous embodiments. This optimization refers to the particular association between the TDD configurations and the code points provided by the two CFIs. In general, the HARQ feedback timing depends on whether a subframe is a downlink or an uplink subframe. For example, section 10.1.3 and subsections in 3GPP TS 36.213 v11.0.0 define a relation between downlink shared channel transmissions on PDSCH and when a UE is expected to transmit a corresponding ACK or NACK feedback from a successful or unsuccessful reception of the transmitted transport block(s). By definition, such a feedback can only be transmitted on uplink resources. It should be noted that the 3GPP LTE specification up to Release 11 does not allow the transmission of PUCCH-based ACK/NACK feedback in a special subframe, even though some uplink resources would be available therein. In order to determine the ACK/NACK feedback and the corresponding feedback transmission in due time at the UE, it is preferred that the UE knows well in advance which subframes will have uplink resources available for such a feedback transmission. This simplifies processing-timing related requirements at the UE side and therefore enables a more cost-effective implementation.

As explained before, whether a particular subframe is a downlink or uplink subframe may depend on the current TDD configuration used in the system. FIG. 32 depicts the currently-defined TDD configurations, as already introduced with FIG. 9, and further indicates those subframes which are downlink or uplink, independent from the particular TDD configuration ("index independent"). As can be appreciated, the uplink/downlink configuration for subframes 0-2 results in always "DSU", downlink-special-uplink; and subframe 5 is always a downlink subframe.

On the other hand, in subframes 3, 4 the uplink/downlink configuration can be "UU", "UD" or "DD". The same applies for the subframes combinations of 7, 8 and 9. For the subframes 6, 7 the TDD configuration can result in "SU", "DD" and "SU".

In order to know as soon as possible whether subframe 3 and 4 of the next radio frame is "UU", "UD" or "DD", the present embodiment suggests an association where the uplink/downlink type of subframes 3 and 4 of the next radio frame is already determined by the first CFI value in the subframe i only. In other words, by determining the first CFI value in the first subframe i (the first of the two subframes carrying the CFI-encoded dynamic TDD re-configuration indication) of radio frame n (e.g. in subframe 1), the mobile terminal may unambiguously determine whether the subframes 3 and 4 are an uplink or downlink subframe. Actually, since subframes 0, 1, 2 and 5 are fixed as well, the first $CFI_{SF1}$ can fix the uplink/downlink configuration of subframes 0-5 of the next radio frame.

This is exemplary depicted in the table of FIG. 33 for the first CFI value of the CFI-encoded dynamic TDD re-configuration indication. As can be appreciated therefrom, independently from the value of $CFI_{SFj}$, (i.e. the second of the two subframes) for $CFI_{SFi}=1$, both subframes 3 and 4 are uplink subframes; for $CFI_{SFi}=2$, subframes 3 and 4 have the uplink/downlink definition "UD"; for $CFI_{SFi}=3$, subframes 3 and 4 have the uplink/downlink definition "DD".

Similarly, the second CFI value of the CFI-encoded TDD re-configuration indication, carried in the second subframe j, fixes the subframe 6 and 7 as well as partly subframes 8 and 9 for the next radio frame n+1. As depicted in FIG. 34, irrespective of the value of the first CFI value, $CFI_{SFi}$, for the $CFI_{SFj}=1$ and $=3$ the TDD configuration of subframes 6 and 7 is "SU"; for the $CFI_{SFj}=2$ the TDD configuration of subframes 6 and 7 is "DD". Furthermore, for the $CFI_{SFj}=2$ the TDD configuration of subframes 8 and 9 is "DD"; for the $CFI_{SFj}=3$ the TDD configuration of subframes 8 and 9 is "UD". For the $CFI_{SFj}=1$ the TDD configuration of subframes 8 and 9 is however not fixed (see FIG. 34), and has to be specified in combination with the first CFI value, $CFI_{SFj}$. For this particular case, FIG. 35 illustrates in a table how the TDD configuration for subframes 8 and 9 can be indicated jointly by the two CFI values, $CFI_{SFi}$ and $CFI_{SFj}$. FIG. 36 illustrates the mapping of available CFI code points with the TDD configurations according to one example, as a combination of the associations given in tables of FIGS. 33, 34 and 35.

Further, even if one CFI value is lost or received erroneously, the TDD configuration of 6-8 subframes out of the 10 subframes can be determined correctly. This is particularly important for UEs to correctly read (E)-PDCCH, CRS; CSI-RS and to limit spurious UL transmissions (i.e. to avoid uplink interference).

In the example given in FIG. 36, the switching point periodicity is further tied unambiguously to the second CFI value, $CFI_{SFj}=2$, so that the correct interpretation is not depending of the correct reception of the first CFI value.

This further optimization can be applied as outlined above to the third embodiment, but also to the other embodiments. For example, in the second embodiment, it would be advantageous if the TDD configurations that correspond to the same first CFI value in subframe i share the same U or D pattern(s) in subframe 3 or in subframes 3 and 4. It would be further advantageous if the TDD configurations that correspond to the same second CFI value in subframe j share the same U or D pattern(s) in subframe 6 or in subframes 6 and 7. As another example, in the first embodiment, it would be advantageous if the TDD configurations that correspond to at least one CFI value, e.g. an invalid CFI value, in subframe i share the same U or D pattern(s) in subframe 3 or in subframes 3 and 4. It would be further advantageous if the TDD configurations that correspond to at least one CFI value, e.g. an invalid CFI value, in subframe j share the same U or D pattern(s) in subframe 6 or in subframes 6 and 7.

Hardware and Software Implementation of the Invention

Another embodiment of the invention relates to the implementation of the above described various embodiments using hardware and software. In this connection the invention provides a user equipment (mobile terminal) and a eNodeB (base station). The user equipment is adapted to perform the methods described herein.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method comprising:
    setting by a base station a first value of an indicator in a first subframe i of a radio frame n and setting a second value of the indicator in a second subframe j of the same radio frame n to encode a Time Division Duplex (TDD) configuration, the TDD configuration defining uplink, downlink and special subframes for radio frames;
    transmitting by the base station the TDD configuration to a mobile station in communication system;
    determining by the mobile station the first value of the indicator in the first subframe i and the second value of the indicator in the second subframe j and determining the TDD configuration based on a code point which is composed by the determined first and second value of the indicator,
    wherein the indicator is a control format indicator, CFI, intended to be used in a downlink or special subframe for indicating a control region length in said downlink or special subframe and wherein i=1 and j=6 out of subframes 0-9 of the radio frame n.

2. The method according to claim 1, wherein the CFI can take a value of either 1, 2 or 3,
    wherein the TDD configuration is encoded by setting at least one of the value of the CFI in the first and second subframes i, j to the value 3,
    wherein in case at least one of the two CFIs in the respective subframes i and j of radio frame n has the value 3, the mobile station determines the TDD configuration based on the code point which is composed by the determined first and second value of the two CFIs, and
    wherein in case neither of the two CFIs in the respective subframes 1 and 6 of radio frame n has the value 3, the mobile station does not determine the TDD configuration but determines the control region length in the subframes 1 and 6 respectively based on the determined first and second value of the two CFIs.

3. The method according to claim 2, wherein the TDD configuration, determined based on the code point which is composed by the first CFI value being 3 and the second CFI value being 3, is a TDD configuration that is associated with a lowest probability of selection based on the code point which is composed by the first CFI value and the second CFI value.

4. The method according to claim 2, wherein the mobile station is configured with a default TDD configuration, the default TDD configuration defining more uplink subframes in a radio frame than downlink subframes and being associated with TDD configuration index 0 or 6, and
wherein the TDD configurations determined by the CFI values in subframes 1 and 6 define at least as many downlink subframes in a radio frame as uplink subframes, and the TDD configurations being associated with at least one of TDD configuration index 1, 2, 3, 4 and 5, and
wherein the default TDD configuration is a TDD configuration conveyed to the mobile station using a system information acquisition procedure or a system information change procedure.

5. The method according to claim 1, wherein the CFI can take either the value of 1, 2 or 3,
wherein the TDD configuration is encoded by setting the value of the CFI in the first and second subframes i, j to one of the values 1 or 2,
wherein the mobile station determines the TDD configuration based on the code point which is composed by the determined first and second value of the CFI,
wherein the mobile station determines the control region length in the subframes i and j respectively based on the first and second value of the CFIs, and
wherein one TDD configuration out of the TDD configurations determined based on the two CFI values respectively having the value 1 or 2, is a default TDD configuration with which the mobile station is configured.

6. The method according to claim 5, wherein the default TDD configuration defines more uplink subframes in a radio frame than downlink subframes, and the default TDD configuration being associated with a TDD configuration index 0 or 6, and
wherein the TDD configurations determined by the CFI values in subframes 1 and 6 define at least as many downlink subframes in a radio frame as uplink subframes, default TDD configuration being associated with at least one of TDD configuration index 1, 2, 3, 4 and 5.

7. The method according to claim 1, wherein the CFI can take either the value of 1, 2 or 3,
wherein the TDD configuration is encoded by setting the value of the CFI in the first and second subframes i, j, to one of the values 1, 2 or 3,
wherein the mobile station determines the control region length in the first and second subframes i, j of radio frame n based on: 1) a predetermined control region length, set for the first and second subframe i, j respectively of radio frame n, 2) the value of the CFI in the first and second subframes i, j respectively, when the CFI value is 1 or 2, or 3) a length value of a Physical HARQ, Hybrid Automatic Repeat Request, Indicator Channel, PHICH in the respective subframe i, j, and wherein the TDD configuration, determined based on the first CFI value being 3 and the second CFI value being 3, is associated with a TDD configuration that is associated with a lowest probability of selection based on the code point which is composed by the first CFI value and the second CFI value.

8. A mobile station comprising:
a receiver which, in operation, receives an indicator in a first subframe i of a radio frame n and receives the indicator in a second subframe j of the same radio frame n, wherein a first value of the indicator in the first subframe i of the radio frame n and the second value of the indicator in the second subframe j of the same radio frame n encode a Time Division Duplex, (TDD) configuration, the TDD configuration defining uplink, downlink and special subframes for radio frames,
circuitry which, in operation, determines a first value of the indicator in the first subframe i and a second value of the indicator in the second subframe j, and
determines the TDD configuration based on a code point which is composed by the determined first and second value of the indicator,
wherein the indicator is a control format indicator, CFI, intended to be used in a downlink or special subframe for indicating a control re ion length in said downlink or special subframe and wherein i=1 and j=6 out of subframes 0-9 of the radio frame n.

9. The mobile station according to claim 8, wherein the CFI can take a value of either 1, 2 or 3,
wherein the TDD configuration is encoded by setting at least one of the value of the CFI in the first and second subframes i, j to the value 3,
wherein
the circuitry, in operation, determines whether at least one of the two CFIs in the respective subframes i and j of radio frame n has the value 3,
wherein in case at least one of the two CFIs in the respective subframes i and j of radio frame n has the value 3, the processor determines the TDD configuration based on the code point which is composed by the determined first and second value of the two CFIs, and
wherein in case neither of the two CFIs in the respective subframes 1 and 6 of radio frame n has the value 3, the processor does not determine the TDD configuration but determines the control region length in the subframes 1 and 6 respectively based on the determined first and second value of the two CFIs.

10. The mobile station according to claim 8, wherein the CFI can take either the value of 1, 2 or 3,
wherein the TDD configuration is encoded by setting the value of the CFI in the first and second subframes i, j to one of the values 1 or 2,
wherein
the circuitry, in operation, determines the TDD configuration based on the code point which is composed by the determined first and second value of the CFI, and
wherein the circuit, in operation, determines the control region length in the subframes i and j respectively based on the first and second value of the CFIs.

11. The mobile station according to claim 8, wherein the CFI can take either the value of 1, 2 or 3,
wherein the TDD configuration is encoded by setting the value of the CFI in the first and second subframes i, j, to one of the values 1, 2 or 3, and
wherein
the circuitry, in operation, determines the control region length in the first and second subframes i, j of radio frame n based on: 1) a predetermined control region length, set for the first and second subframe i, j respectively of radio frame n, 2) the value of the CFI in the first and second subframes i, j respectively, when the CFI value is 1 or 2, or 3) a length value of a Physical HARQ, Hybrid Automatic Repeat Request, Indicator Channel, PHICH in the respective subframe i, j.

12. A base station comprising:
circuitry, which in operation, determines Time Division Duplex (TDD) configuration, the TDD configuration defining uplink, downlink and special subframes for radio frames, and
sets a first value of an indicator in a first subframe i of a radio frame n and to set a second value of the indicator in a second subframe j of the same radio frame n to encode the determined TDD configuration; and
a transmitter which, in operation, transmits the radio frame to a mobile station, including the indicator in the first subframe i and the indicator in the second subframe j, wherein a code point which is composed by the first and second value of the indicator indicates the TDD configuration of the mobile terminal,
wherein the indicator is a control format indicator, CFI, intended to be used in a downlink or special subframe for indicating a control region length in said downlink or special subframe and wherein i=1 and j=6 out of subframes 0-9 of the radio frame n.

13. The base station according to claim 12, wherein the CFI can take a value of either 1, 2 or 3,
wherein
the circuitry, in operation, sets at least one of the value of the CFI in the first and second subframes i, j to the value 3 when encoding the determined TDD configuration,
determines a control channel region length for respectively the first and second subframes i, j, and
sets the value of the CFI in the first and second subframes i, j to one of either 1 or 2, based on the determined control channel region length for respectively the first and second subframes i, j.

14. The base station according to claim 13, wherein the circuitry, in operation, associates the TDD configuration, of the first CFI value being 3 and the second CFI value being 3, with a TDD configuration having a lowest probability of selection based on the first CFI value and the second CFI value.

15. The base station according to claim 12, wherein the CFI can take either the value of 1, 2 or 3,
wherein
the circuitry, in operation, sets the value of the CFI in the first and second subframes i, j to one of the values 1 or 2 for encoding the determined TDD configuration, and
wherein a transmitter, in operation, transmits control channels in the subframes i and j based on respectively the first and second value of the CFIs.

16. The base station according to claim 12, wherein the CFI can take either the value of 1, 2 or 3,
wherein the circuitry, in operation, sets the value of the CFI in the first and second subframes i, j, to one of the values 1, 2 or 3 for encoding the determined TDD configuration, and
wherein a transmitter, in operation, transmits control channels in the subframes i and j based on: 1) a predetermined control region length, set for the first and second subframes i, j respectively of radio frame n, 2) the value of the CFI in the first and second subframes i, j respectively, when the CFI value is 1 or 2, or 3) a length value of a Physical HARQ, Hybrid Automatic Repeat Request, Indicator Channel, PHICH in the respective subframe i, j.

* * * * *